US008640329B2

(12) United States Patent
Aguiar et al.

(10) Patent No.: US 8,640,329 B2
(45) Date of Patent: Feb. 4, 2014

(54) HYBRID FIBER/COPPER CABLE PREPARATION TOOL

(75) Inventors: Wagner Da Silva Aguiar, Brunswick, NY (US); Kenneth Christopher Nardone, North Bennington, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 1056 days.

(21) Appl. No.: 12/552,842

(22) Filed: Sep. 2, 2009

(65) Prior Publication Data
US 2010/0058581 A1 Mar. 11, 2010

Related U.S. Application Data

(60) Provisional application No. 61/093,910, filed on Sep. 3, 2008.

(51) Int. Cl.
*B23P 19/00* (2006.01)
*H01R 43/00* (2006.01)

(52) U.S. Cl.
USPC ........ 29/747; 29/566; 29/758; 7/107; 30/90.1

(58) Field of Classification Search
USPC ........ 29/33 F, 33 M, 566, 745, 747, 758, 825, 29/868; 7/107; 30/90.1, 91.1; 81/9.41, 81/9.51; 385/62, 75
See application file for complete search history.

(56) References Cited

U.S. PATENT DOCUMENTS

| | | | |
|---|---|---|---|
| 3,182,532 A | 5/1965 | Oehlerking | |
| 4,059,892 A | 11/1977 | Siden | |
| 4,584,912 A | 4/1986 | Gudmestad et al. | |
| 4,601,093 A | 7/1986 | Cope | |
| 4,619,164 A | 10/1986 | Aikens | |
| 4,745,828 A | 5/1988 | Stepan | |
| 4,805,301 A | 2/1989 | Chapin et al. | |
| 4,932,299 A | 6/1990 | Haines et al. | |

(Continued)

FOREIGN PATENT DOCUMENTS

| | | |
|---|---|---|
| DE | 196 41 616 A1 | 4/1998 |
| DE | 203 01 693 U1 | 1/2003 |

(Continued)

OTHER PUBLICATIONS

International Search Report and Written Opinion mailed Dec. 10, 2009.

(Continued)

*Primary Examiner* — Donghai D Nguyen
(74) *Attorney, Agent, or Firm* — Merchant & Gould P.C.

(57) ABSTRACT

A tool includes a base with first and second ends and sides. First, second, and third openings extend from the first end. A slot in the first side communicates with the first opening for receiving a cutting tool. Another slot communicates with the second opening for receiving a marking tool. The third opening forms a stop surface. A recess in the first side and in the second end defines a platform. A channel extends from the third opening thereacross to second end. Two pins project on opposite sides of the channel. The base includes a stationary portion on which the pins are located and a pivotal portion defining the second end. The stationary portion defines a supplemental end surface facing parallel to second end. A cutout aligned with the cable channel extends from the platform to the second side and from the supplemental end surface into the stationary portion.

7 Claims, 28 Drawing Sheets

(56) References Cited

U.S. PATENT DOCUMENTS

| | | | |
|---|---|---|---|
| 4,969,703 A | 11/1990 | Fyfe et al. | |
| 4,993,147 A | 2/1991 | Carpenter et al. | |
| 5,003,846 A | 4/1991 | Yagawa et al. | |
| 5,010,797 A | 4/1991 | Stepan | |
| 5,016,500 A | 5/1991 | Conrad et al. | |
| 5,172,620 A | 12/1992 | Faust | |
| 5,269,206 A | 12/1993 | Yagawa | |
| 5,295,421 A | 3/1994 | Mansfield | |
| 5,320,002 A | 6/1994 | Sayyadi et al. | |
| 5,351,580 A | 10/1994 | Potesta et al. | |
| 5,398,573 A | 3/1995 | Wollermann | |
| 5,438,753 A | 8/1995 | Stepan | |
| 5,445,051 A | 8/1995 | Carpenter et al. | |
| 5,517,881 A | 5/1996 | Burns | |
| 5,561,899 A | 10/1996 | Carpenter et al. | |
| 5,582,078 A | 12/1996 | Talley | |
| 5,669,276 A | 9/1997 | Spacek | |
| 5,787,768 A | 8/1998 | Talley | |
| 6,023,844 A | 2/2000 | Hinson, II et al. | |
| 6,176,155 B1 | 1/2001 | Palmowski et al. | |
| 6,237,743 B1 | 5/2001 | Bracher | |
| 6,286,393 B1 | 9/2001 | Messer et al. | |
| 6,321,621 B1 * | 11/2001 | Stepan | 81/9.51 |
| 6,360,430 B1 | 3/2002 | Stepan | |
| 6,561,061 B1 | 5/2003 | Stepan | |
| 6,598,497 B1 * | 7/2003 | Sato et al. | 81/9.41 |
| 6,718,624 B1 | 4/2004 | Rohrbach et al. | |
| 6,910,256 B2 | 6/2005 | Locher et al. | |
| 6,983,534 B2 | 1/2006 | Zeibig et al. | |
| 7,213,975 B2 | 5/2007 | Khemakhem et al. | |
| 7,393,144 B2 | 7/2008 | Khemakhem et al. | |
| 7,481,585 B2 | 1/2009 | Scadden et al. | |
| 7,490,994 B2 | 2/2009 | Scadden et al. | |
| 8,083,416 B2 | 12/2011 | Scadden et al. | |
| 2007/0003203 A1 | 1/2007 | Palmer | |

FOREIGN PATENT DOCUMENTS

| | | |
|---|---|---|
| EP | 0 430 868 A1 | 6/1991 |
| EP | 0 710 858 A1 | 5/1996 |
| EP | 1 028 330 A1 | 8/2000 |
| EP | 1 037 077 A2 | 9/2000 |
| EP | 1 070 374 B1 | 3/2002 |
| EP | 1 413 903 A1 | 4/2004 |
| JP | 10-115715 | 5/1998 |
| JP | 11 084138 A | 3/1999 |
| JP | 11-84140 | 3/1999 |
| JP | 2000-111741 | 4/2000 |
| JP | 2004-191676 | 7/2004 |
| JP | 2005-338318 | 12/2005 |
| WO | WO 89/02796 | 4/1989 |
| WO | WO 98/33082 | 7/1998 |

OTHER PUBLICATIONS

Schleuniger®, FiberStrip 7030/7035—Stripping Machines, Undated, 4 Pages.

* cited by examiner

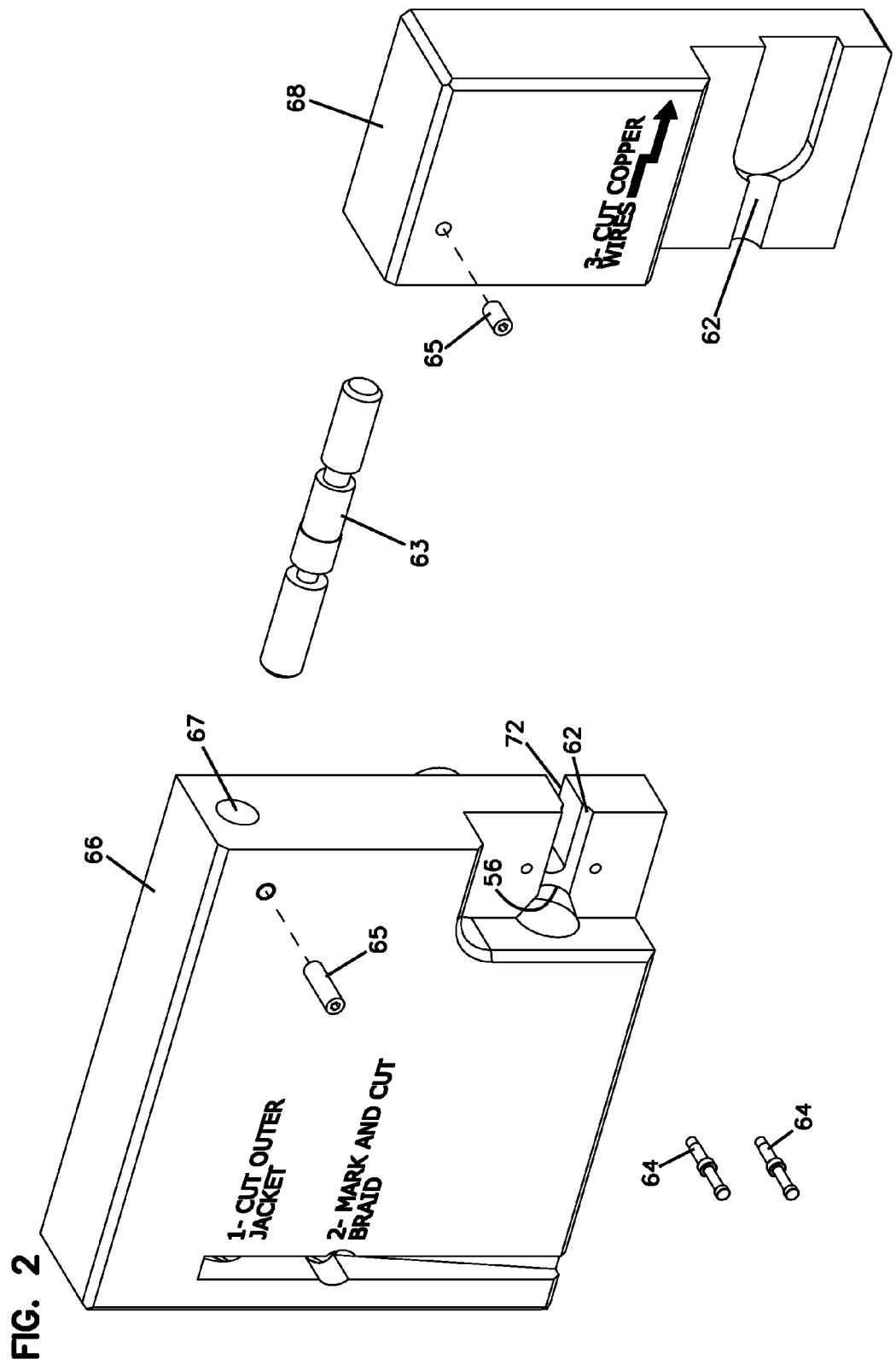

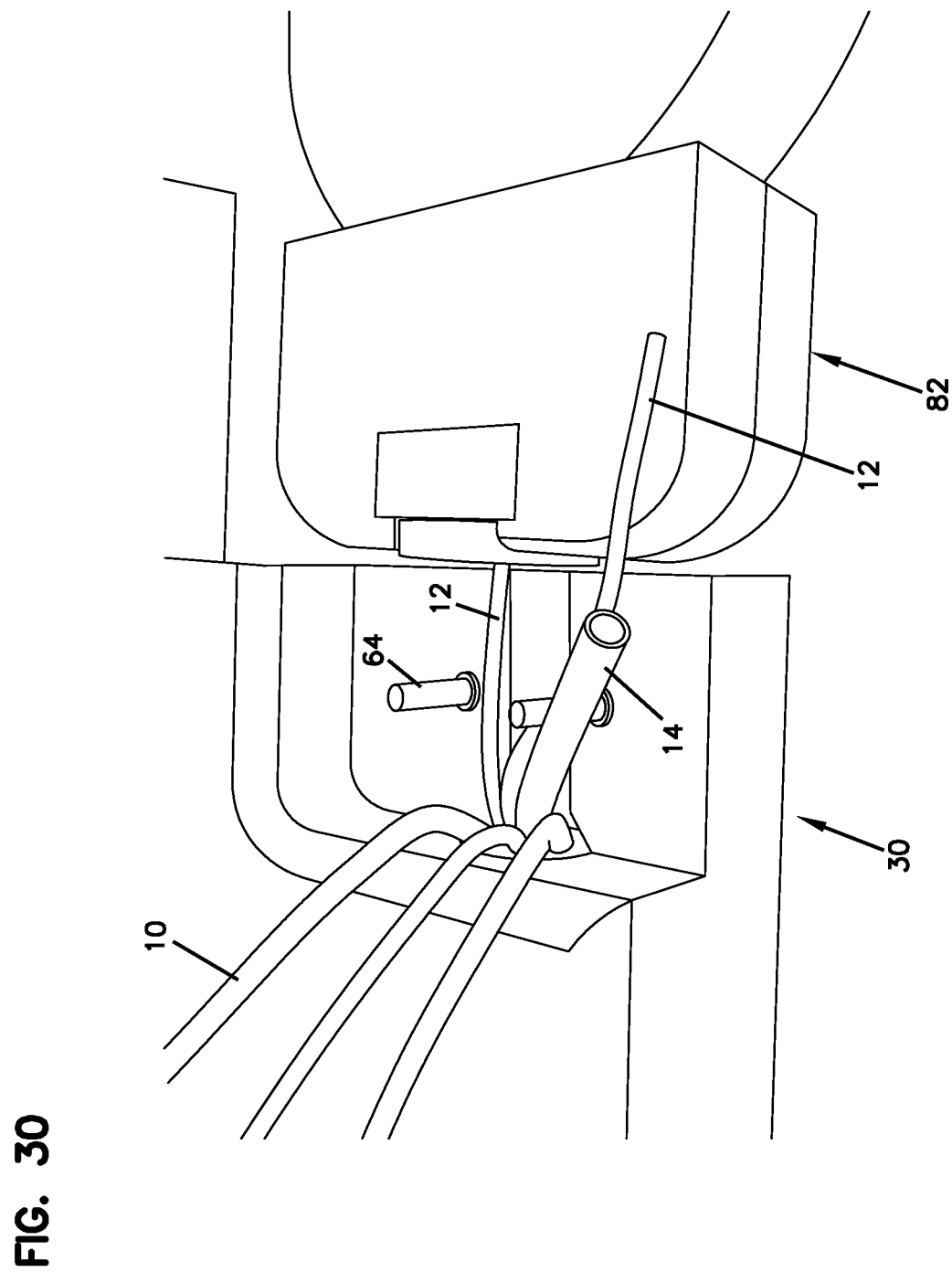

HYBRID FIBER/COPPER CABLE PREPARATION TOOL

CROSS REFERENCE TO RELATED APPLICATION(S)

This application claims priority to provisional application Ser. No. 61/093,910, filed Sep. 3, 2008, which application is incorporated herein by reference in its entirety.

TECHNICAL FIELD

The present disclosure relates generally to terminating communications cables to connectors. More specifically, the present disclosure relates to a tool for preparing a hybrid fiber/copper cable for termination to a hybrid fiber/copper connector.

BACKGROUND

U.S. Pat. Nos. 7,213,975 and 7,393,144 illustrate a schematic cross-section of a hybrid fiber/copper communications cable. The hybrid cable, illustrated in FIG. 4 of U.S. Pat. No. 7,213,975 and U.S. Pat. No. 7,393,144, includes a pair of jacketed optical fibers and four jacketed copper wires, extending adjacent a linearly extending strength member. This is one example configuration of a hybrid cable that is used in the telecommunications industry. Other configurations of hybrid cables are also known, with more or fewer optical fibers and/or copper wires.

For example, according to another example configuration, a hybrid cable 5 might have six copper conductors 10, two fibers 12, and one strength member 14, all surrounded by a metal braid 16 for grounding. The metal braid 16 is surrounded by an outer cable jacket 18. A cable filler 20 made out of pvc material may also be used to surround the inner components.

Two of the copper wires 10 might be used for communications purposes, four of the copper wires 10 might be used for transmitting power, and the two optical fibers 12 are used for transmitting optical signals. When used in, for example, a broadcast camera environment, one of the optical fibers 12 may be used to transmit video and related audio signals to the camera and the second optical fiber 12 may be used to transmit video and audio captured by the camera to the production facility or some other location. One or more pairs of copper conductors 10 may be used to provide power to operate the camera, while the other pair of copper conductors 10 may be used to provide communications between the production facility and the camera operator. The number of fiber strands and copper conductors extending within the hybrid cable 5 may be varied as required to support the desired usage and communication bandwidth of the camera.

In using these hybrid cables with optical fibers, it is important to prepare the cable 5 by cutting each of the different elements (copper wires 10, optical fibers 12, strength member 14, grounding braid 16, cable jacket 18, etc.) to the correct lengths. The fibers 12 in these cables are normally sensitive to sharp bends. A sharp bend on a fiber inside a connector can easily cause a high insertion loss and cause the optical link system to fail. Some optical systems have a loss budget or allowable attenuation limit of about 10 dB maximum. A sharp bend in the optic fiber 12 can easily pass this threshold and lead to loss of signal. It is also important to ensure that the components within the cable are not cut too short in length, preventing their proper termination within the connector.

Conventionally, it has been common to measure each of the components of the cable 5 to a desired length by using a ruler, mark the desired cut point, and cut each component separately by hand at the cut point. This method has been known to lead to inconsistent results and be time consuming. There is not much room for variations within some connectors, wherein the components must be cut precisely to achieve proper termination. Improvements in cable preparation for hybrid cables and other types of cables utilizing a number of different components are desired.

SUMMARY

The present disclosure relates generally to a preparation tool for preparing a hybrid fiber/copper cable for termination to a telecommunications connector. The present disclosure also relates to a preparation kit for preparing a hybrid fiber/copper cable for termination to a telecommunications connector.

According to one aspect of the present disclosure, the preparation tool includes a base with first and second ends and first and second major sides. A first cable insertion opening extends from the first end toward the second end. A first slot in the first major side is in communication with the first opening for receipt of a jacket cutting tool. A second cable insertion opening extends from the first end toward the second end. A second slot in the first major side is in communication with the second opening for receipt of a cable marking tool. A third cable insertion opening extends from the first end toward the second end. A stop surface is formed in the third cable insertion opening. A recess is formed in the first major side and in the second end and defines a platform.

A cable channel extends from the third cable insertion opening across the platform to the second end of the base. There are located two projecting alignment pins on the platform on opposite sides of the cable channel. The platform includes a stationary portion and a pivotally movable portion. The alignment pins are located on the stationary portion. The movable portion defines the second end of the base. The stationary portion defines a supplemental end surface facing in the same direction as the second end. The preparation tool includes a cutout aligned with the cable channel extending from the supplemental end surface into the stationary portion of the tool.

BRIEF DESCRIPTION OF THE DRAWINGS

The accompanying drawings, which are incorporated in and constitute a part of the specification, illustrate several aspects of the present disclosure and together with the description, serve to explain the principles of the disclosure. A brief description of the drawings is as follows:

FIG. 2 is an exploded perspective view of the hybrid fiber/copper cable preparation tool of FIG. 1;

FIG. 30 illustrates an example method of stripping the other of the optical fibers of the hybrid copper/fiber cable using the cable preparation tool shown in FIGS. 1-19.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like parts.

The present disclosure relates to a hybrid fiber/copper cable preparation tool for preparing a hybrid fiber/copper cable for termination to a telecommunications connector. As will be discussed in further detail below, the preparation tool may be used with other devices, gauges, or tools as part of a kit for preparing the hybrid cable.

According to one example embodiment, the tools and the kit described in the present disclosure are configured to prepare a hybrid cable for termination to a hybrid connector of the type described in U.S. Pat. Nos. 7,481,585 and 7,490,994, U.S. Provisional Patent Application Ser. Nos. 61/005,107 and 61/044,370, and U.S. patent application Ser. No. 12/323,980, the entire disclosures of which are incorporated herein by reference.

Figure 1:
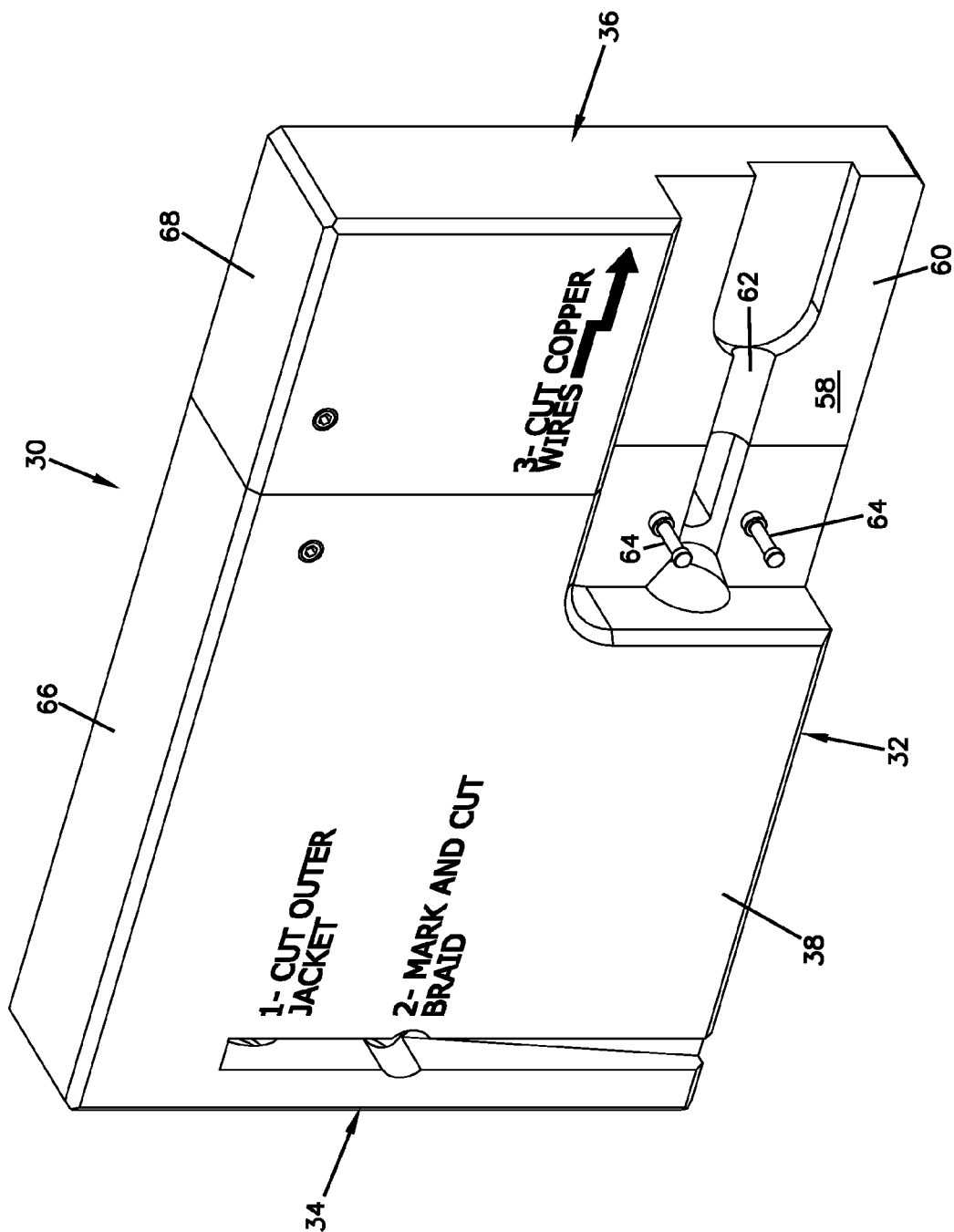
FIG. 1 is a top perspective view of a hybrid fiber/copper cable preparation tool having features that are examples of inventive aspects in accordance with the principles of the present disclosure, the tool shown with cable preparation instruction indicia provided thereon.
Figure 3:
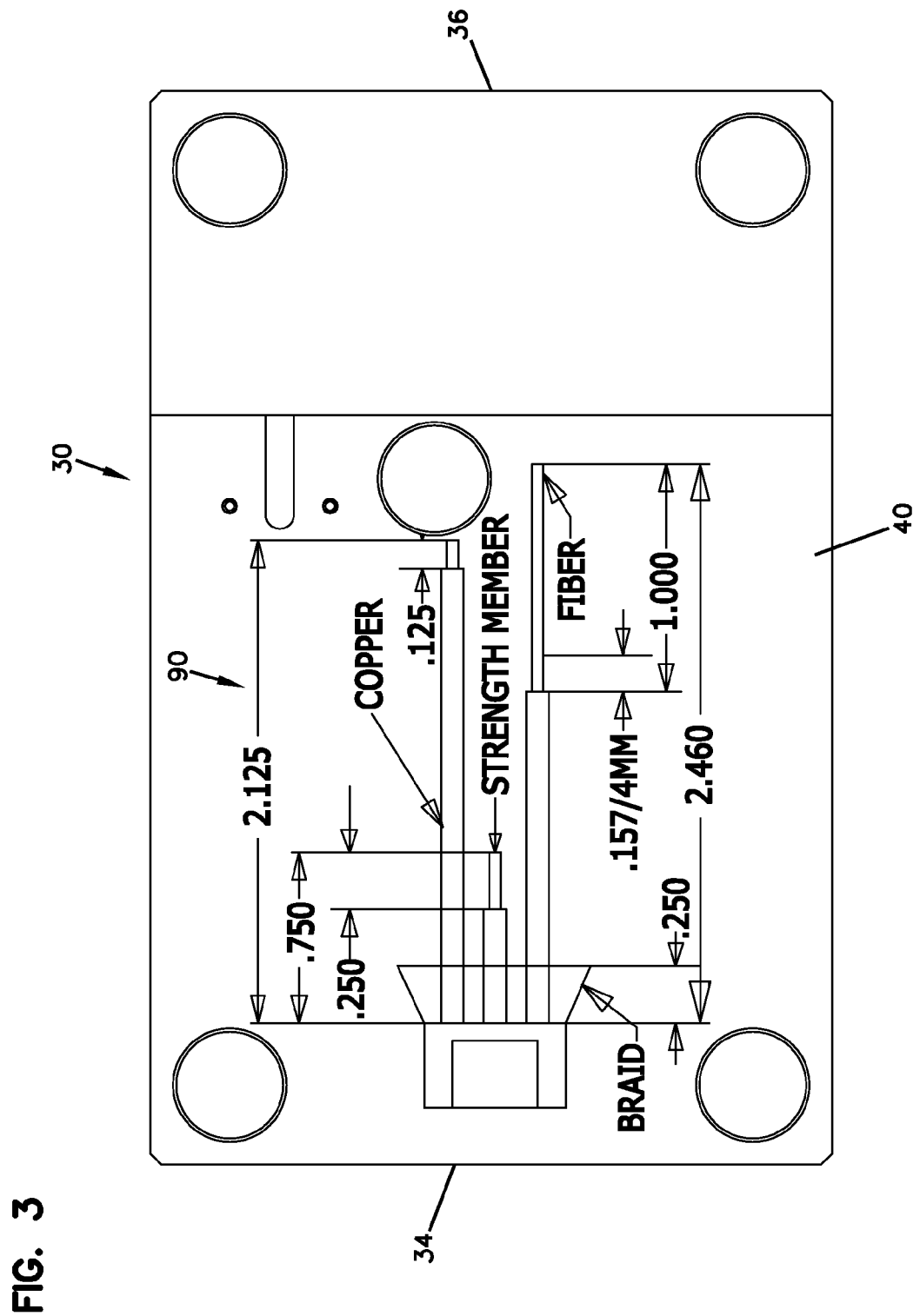
FIG. 3 is a bottom plan view of the hybrid fiber/copper cable preparation tool of FIG. 1.
Figure 4:
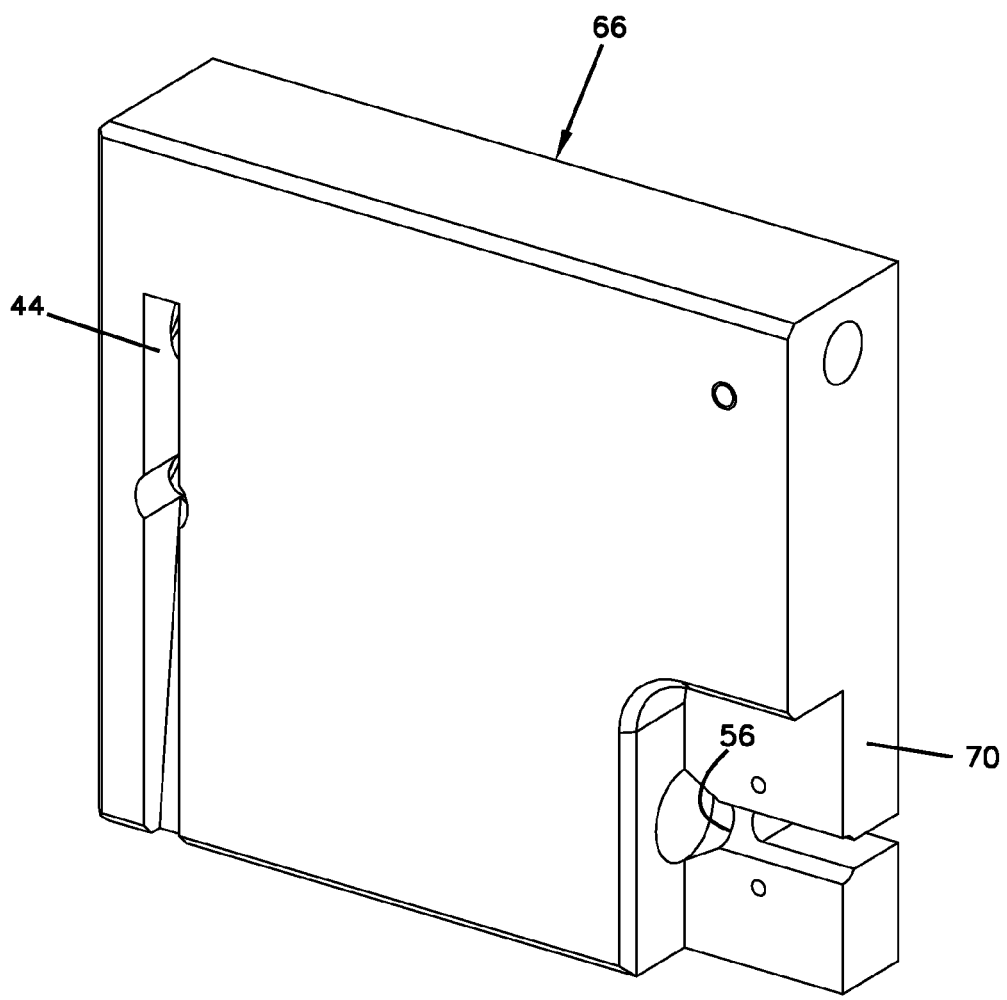
FIG. 4 is a top perspective view of a stationary portion of the hybrid fiber/copper cable preparation tool of FIG. 1.
Figure 5:
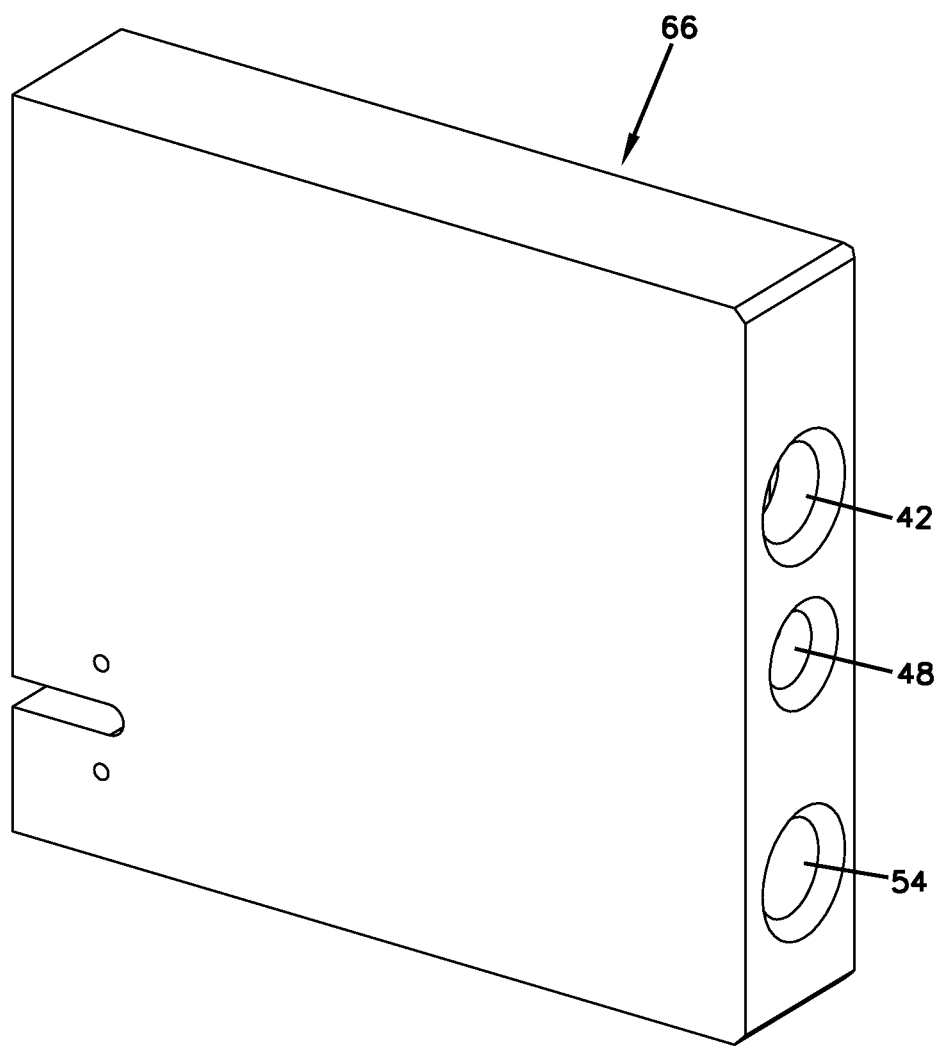
FIG. 5 is a rear perspective view of the stationary portion of the hybrid fiber/copper cable preparation tool of FIG. 1.
Figure 6:
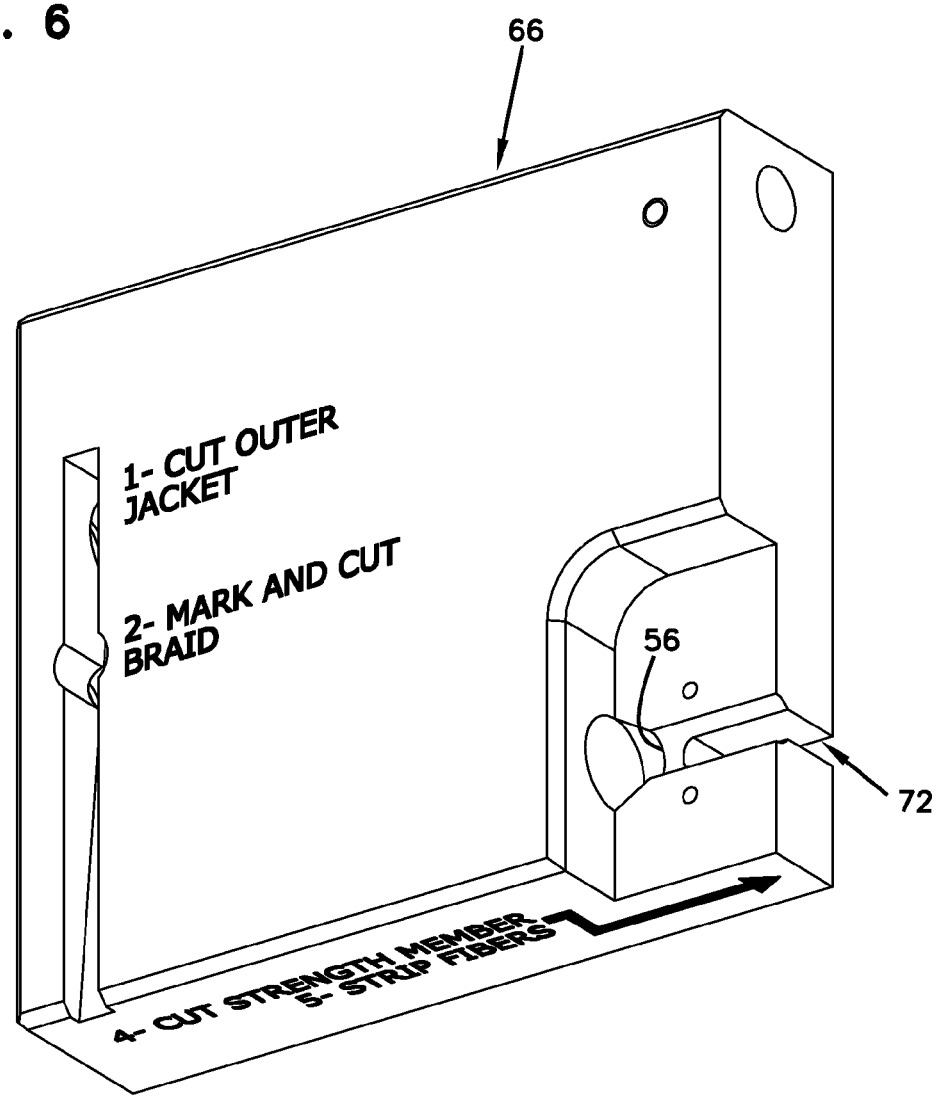
FIG. 6 is another top perspective view of the stationary portion of the hybrid fiber/copper cable preparation tool of FIG. 1, the stationary portion shown with cable preparation instruction indicia provided thereon.
Figure 7:
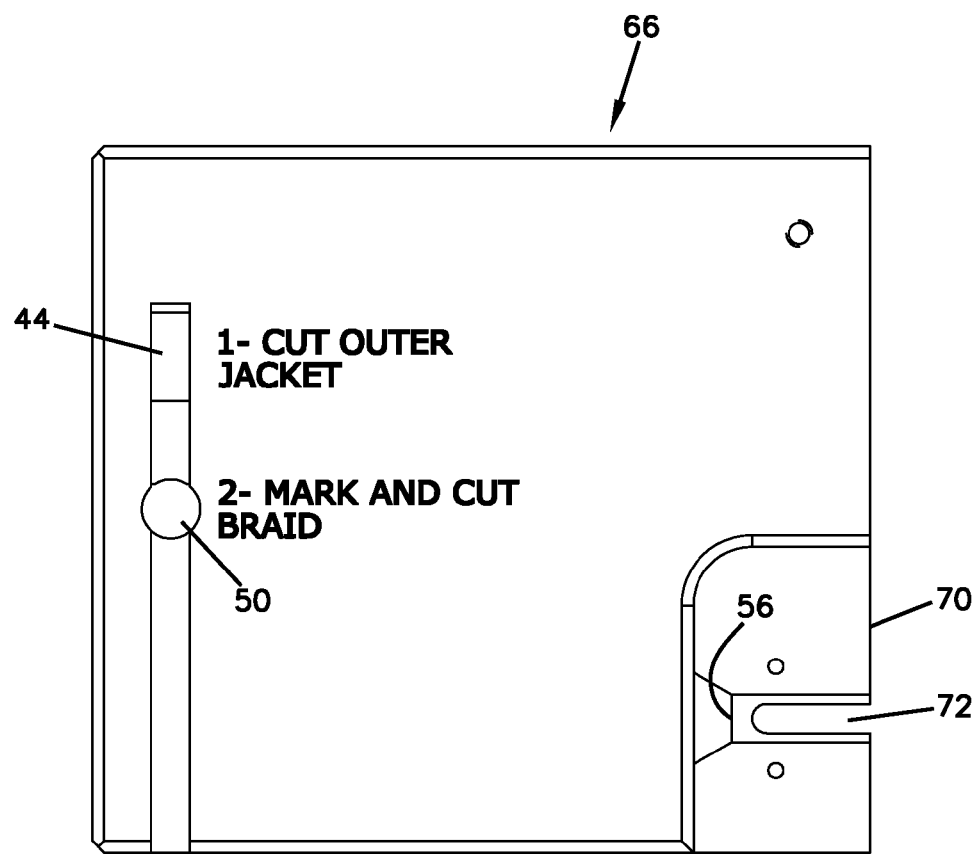
FIG. 7 is a top plan view of the stationary portion of the hybrid fiber/copper cable preparation tool of FIG. 6.
Figure 8:
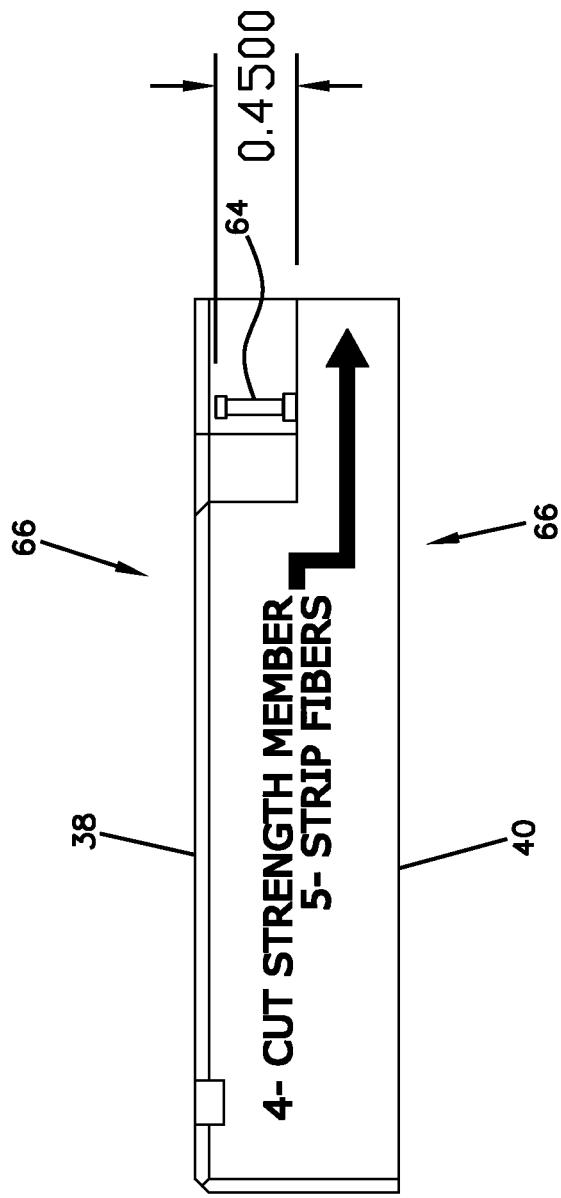
FIG. 8 is a front view of the stationary portion of the hybrid fiber/copper cable preparation tool of FIG. 6.

The preparation tool 30 is shown in FIGS. 1-3. Referring to FIGS. 1-3, the tool 30 includes a base 32 with first and second ends 34, 36 and first and second major sides 38, 40. A first cable insertion opening 42 extends from the first end 34 toward the second end 36. A first slot 44 in the first major side 38 is in communication with the first opening 42 for receipt of a jacket cutting tool 46 (see FIG. 21). A second cable insertion opening 48 extends from the first end 34 toward the second end 36. A second slot 50 in the first major side 38 is in communication with the second opening 48 for receipt of a cable marking tool 52 (see FIG. 23). A third cable insertion opening 54 extends from the first end 34 toward the second end 36. A stop surface 56 is formed in the third cable insertion opening 54. A recess 58 is formed in the first major side 38 and in the second end 36 and defines a platform 60.

A cable channel 62 extends from the third cable insertion opening 54 across the platform 60 to the second end 36 of the base 32. There are located two projecting alignment pins 64 on the platform 60 on opposite sides of the cable channel 62.

Figure 1A:
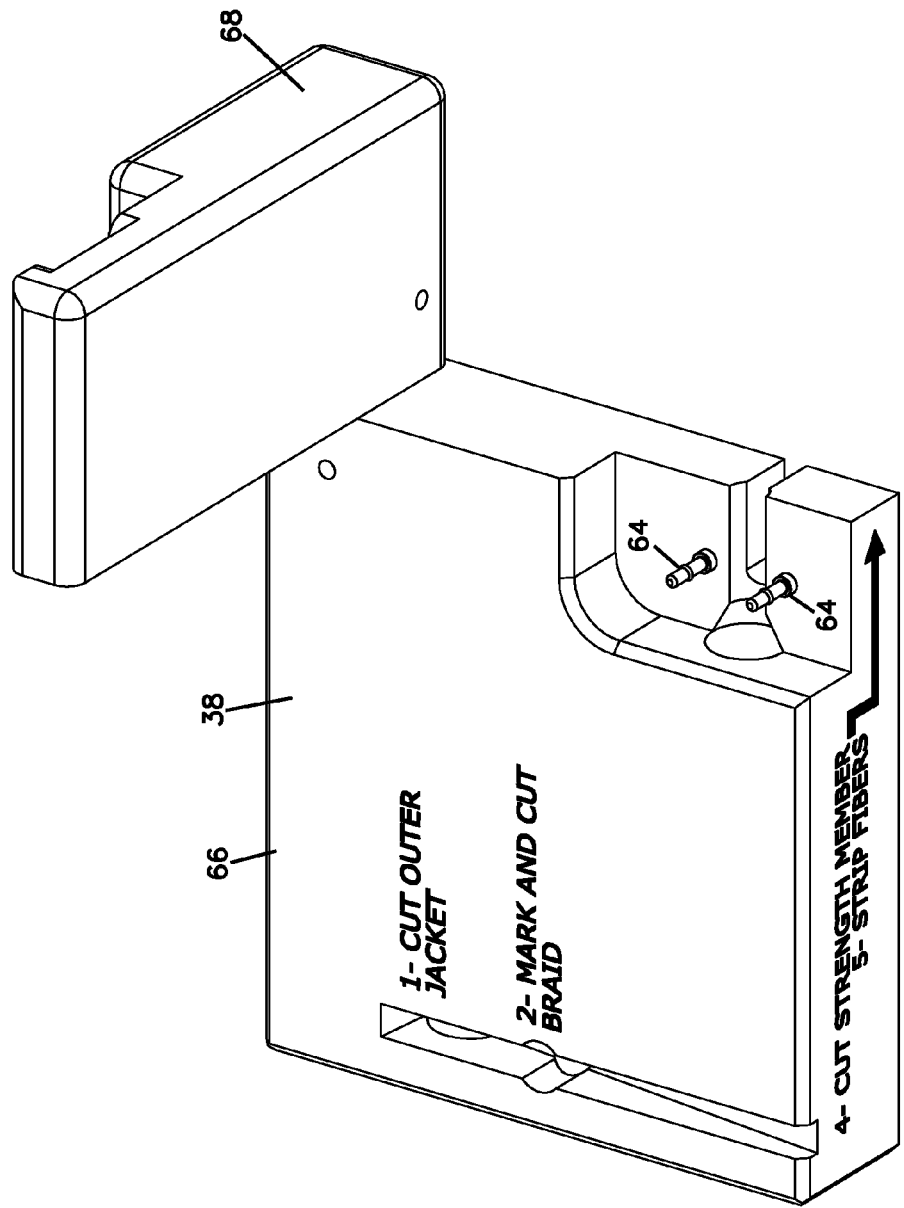
FIG. 1A is another top perspective view of the hybrid fiber/copper cable preparation tool of FIG. 1, the hybrid fiber/copper cable preparation tool shown with a pivotally movable portion of the tool in a pivoted orientation.

Still referring to FIGS. 1-3, the preparation tool 30 includes a stationary portion 66 and a pivotally movable portion 68. FIG. 1A illustrates the cable preparation tool 30 with the movable portion 68 of the tool 30 in a pivoted orientation. It should be noted that the terms "stationary" and "movable" are simply used for ease of description and to describe the relative pivotal movement between these two portions. It should be noted that the "stationary portion 66" may easily be deemed to be the movable portion while the "movable portion 68" may be deemed to be the stationary portion of the tool, depending upon the point of reference. No limitation is implied by the use of these terms.

FIGS. 4-13 illustrate the stationary portion 66 of the preparation tool 30 in isolation. FIGS. 14-17 illustrate the pivotally movable portion 68 of the preparation tool 30 in isolation. The alignment pins 64 are located on the stationary portion 66 and may be mounted on the stationary portion 66 by a variety of methods known in the art including by a press-fit, etc.

Figure 12:
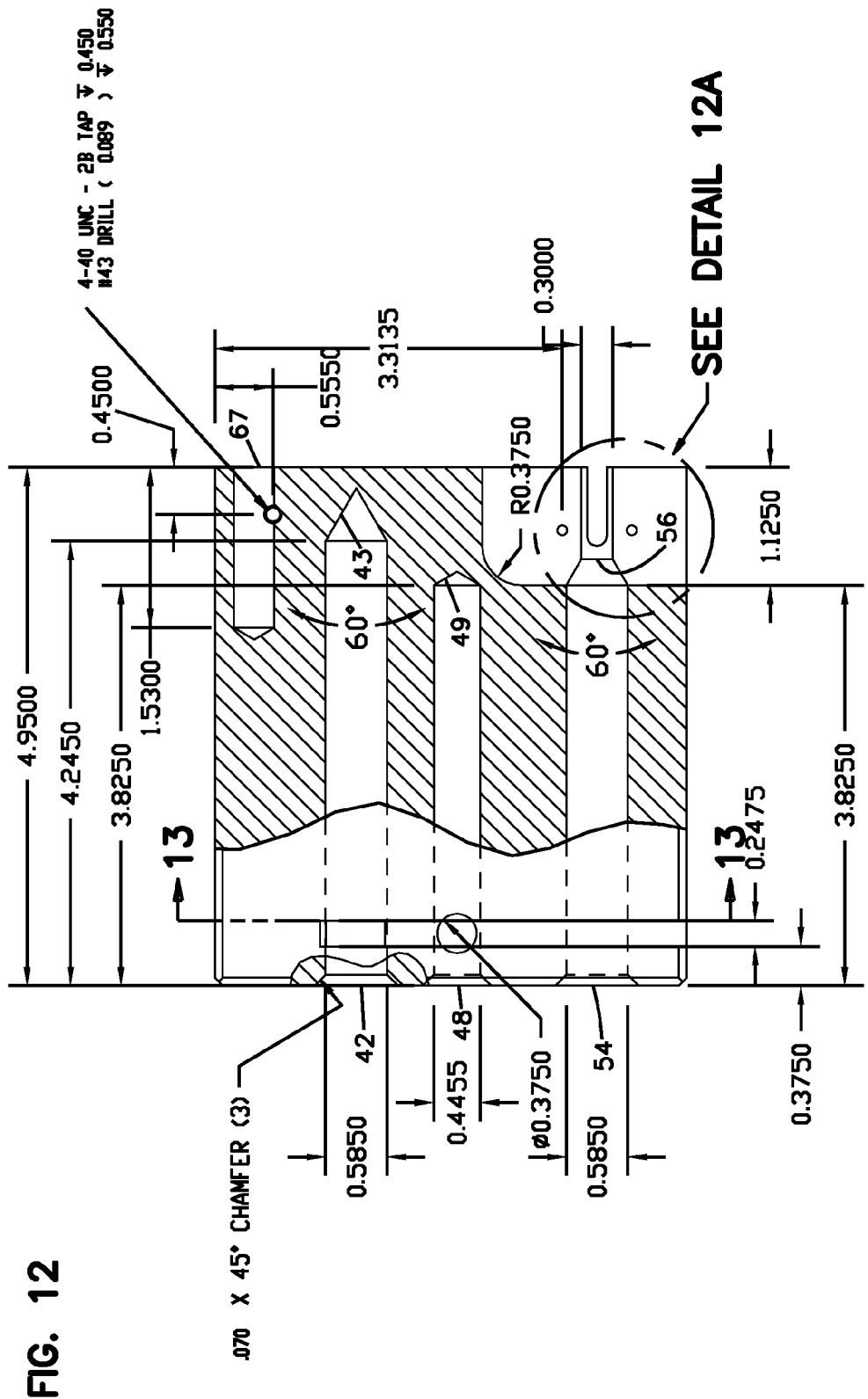
FIG. 12 is a top plan view of the stationary portion of the hybrid fiber/copper cable preparation tool of FIG. 6, with a portion of the stationary portion of the hybrid fiber/copper cable preparation tool shown in a cross-sectional view taken along line 12-12 of FIG. 11.
Figure 12A:
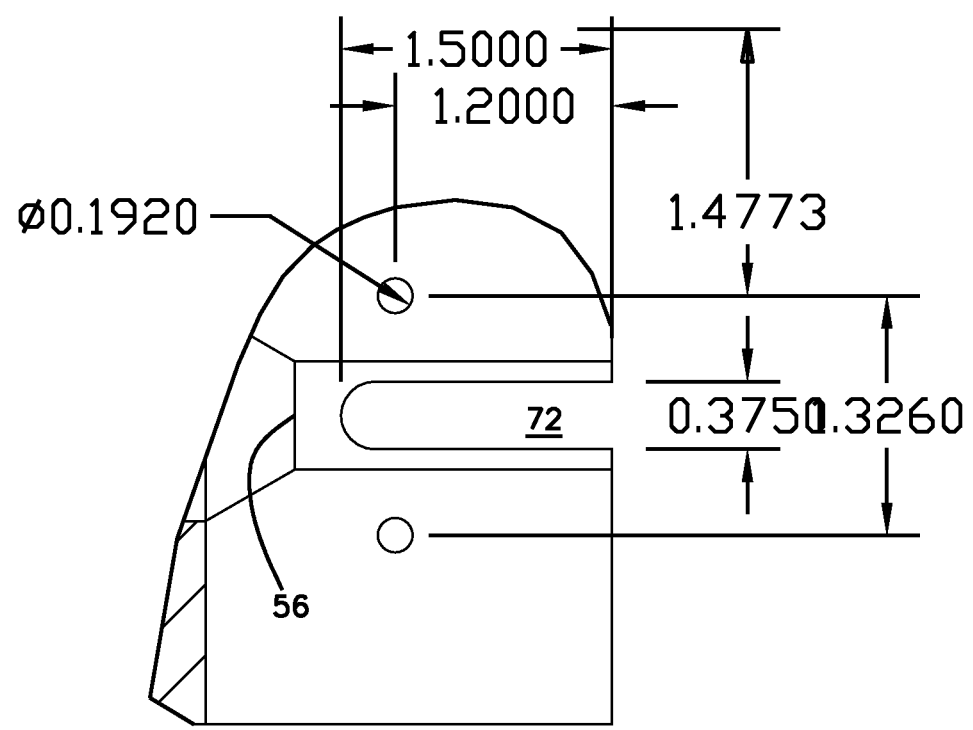
FIG. 12A illustrates a close-up view of a cutout of the stationary portion of the hybrid fiber/copper cable preparation tool of FIG. 12.
Figure 13:
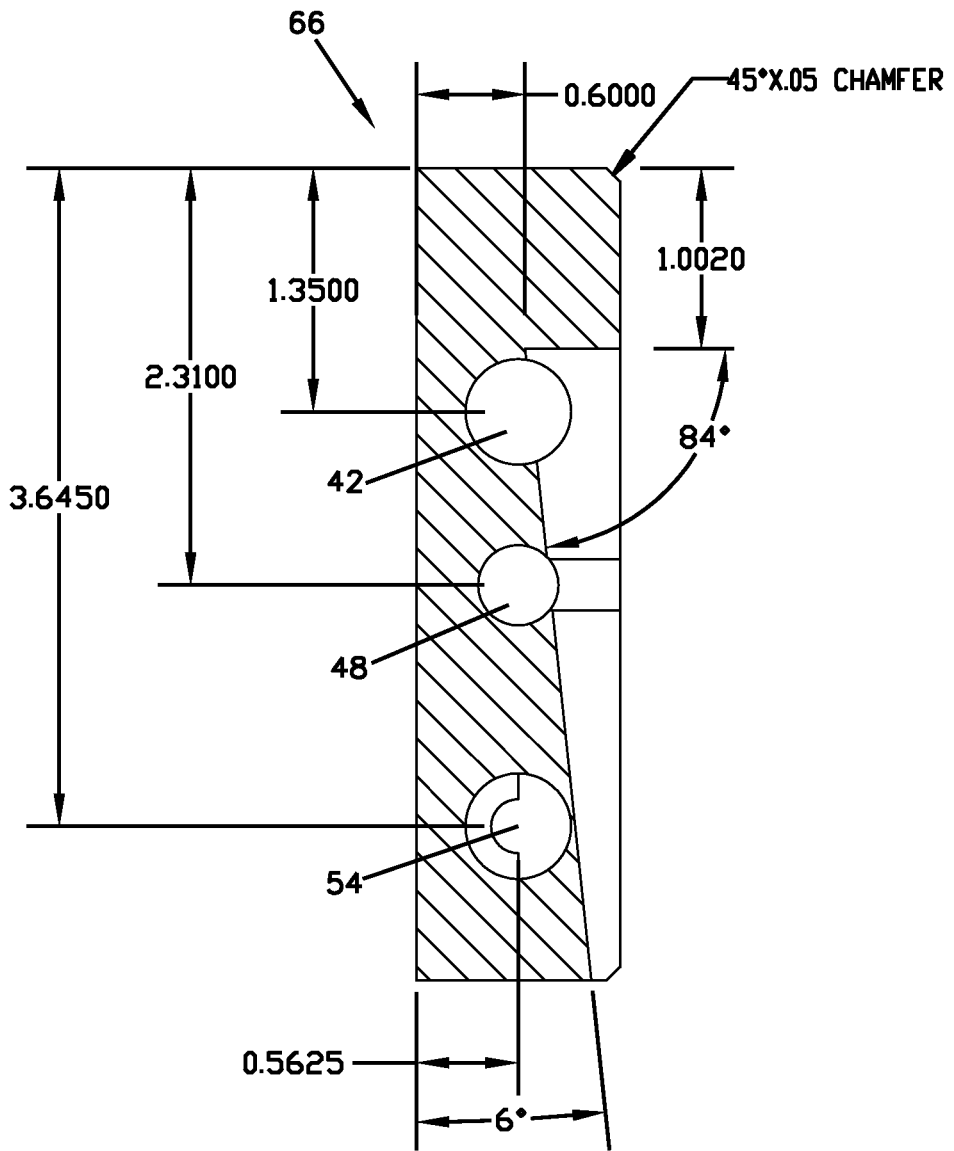
FIG. 13 is a cross-sectional view of the stationary portion of the hybrid fiber/copper cable preparation tool taken along line 13-13 of FIG. 12.
Figure 14:
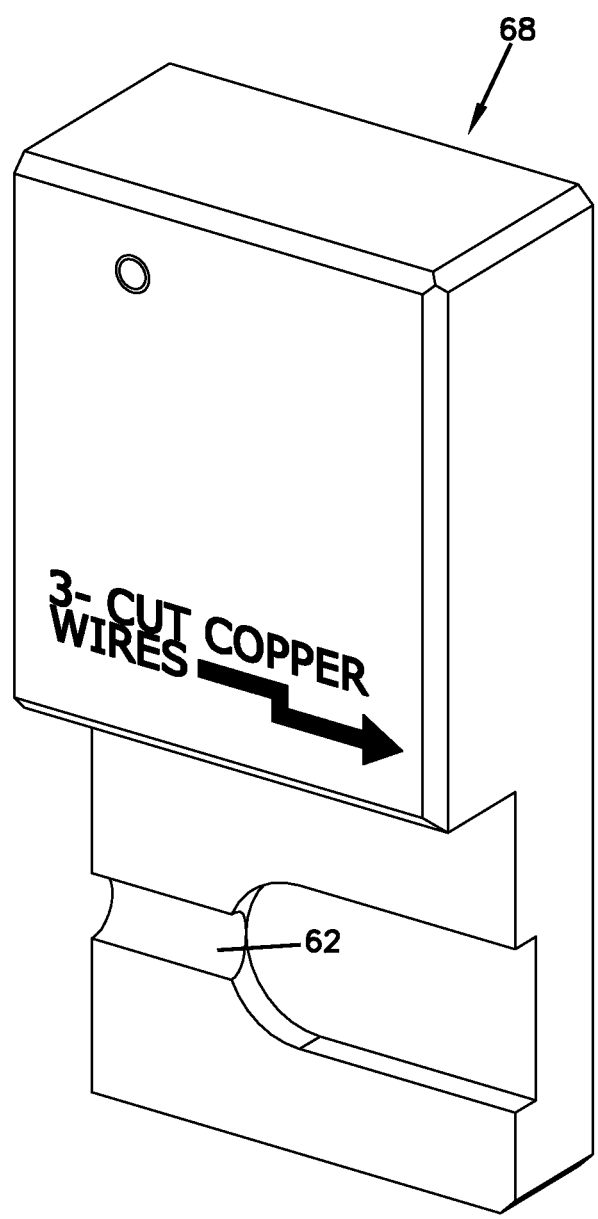
FIG. 14 is a top perspective view of the pivotally movable portion of the hybrid fiber/copper cable preparation tool of FIG. 1, the movable portion shown with cable preparation instruction indicia provided thereon.
Figure 15:
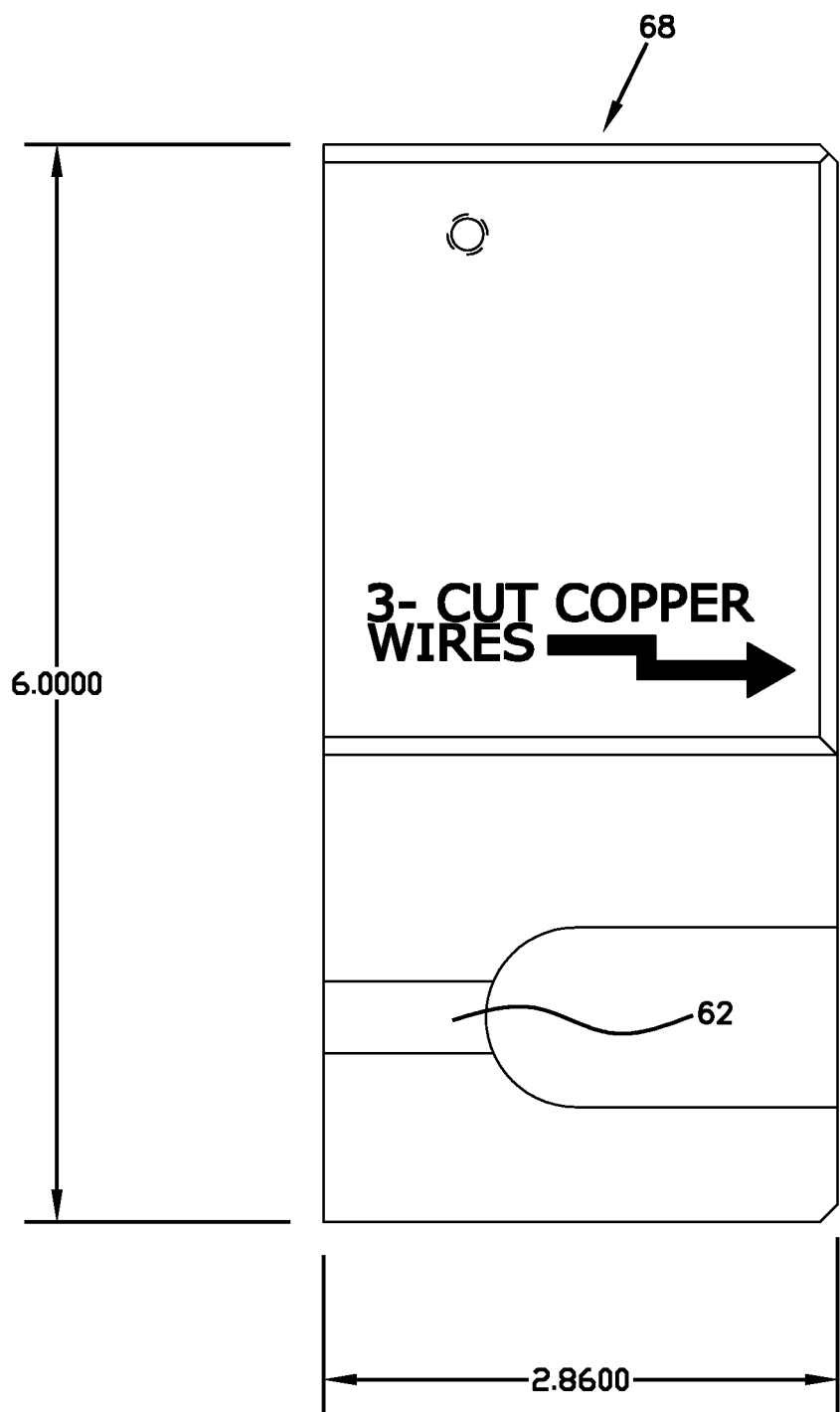
FIG. 15 is a top plan view of the movable portion of the hybrid fiber/copper cable preparation tool of FIG. 14.
Figure 17:
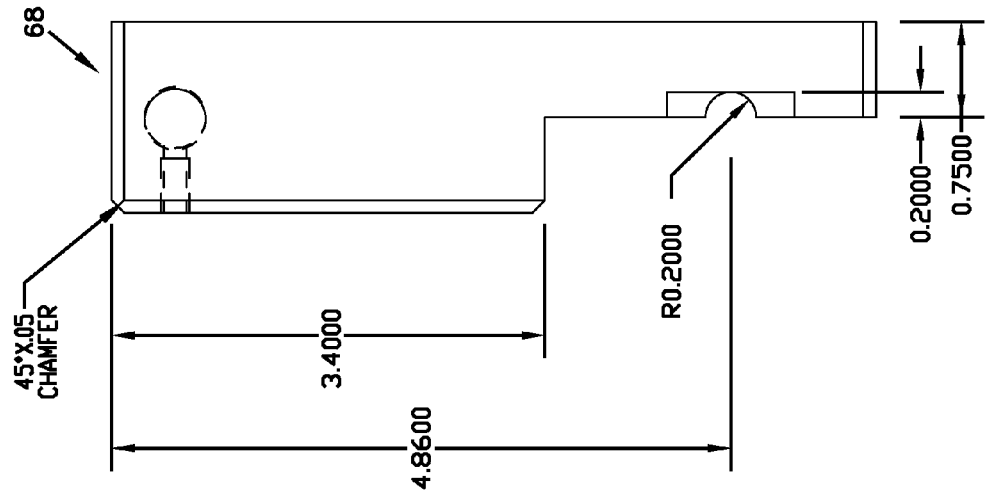
FIG. 17 is a right side view of the movable portion of the hybrid fiber/copper cable preparation tool of FIG. 14.
Figure 16:
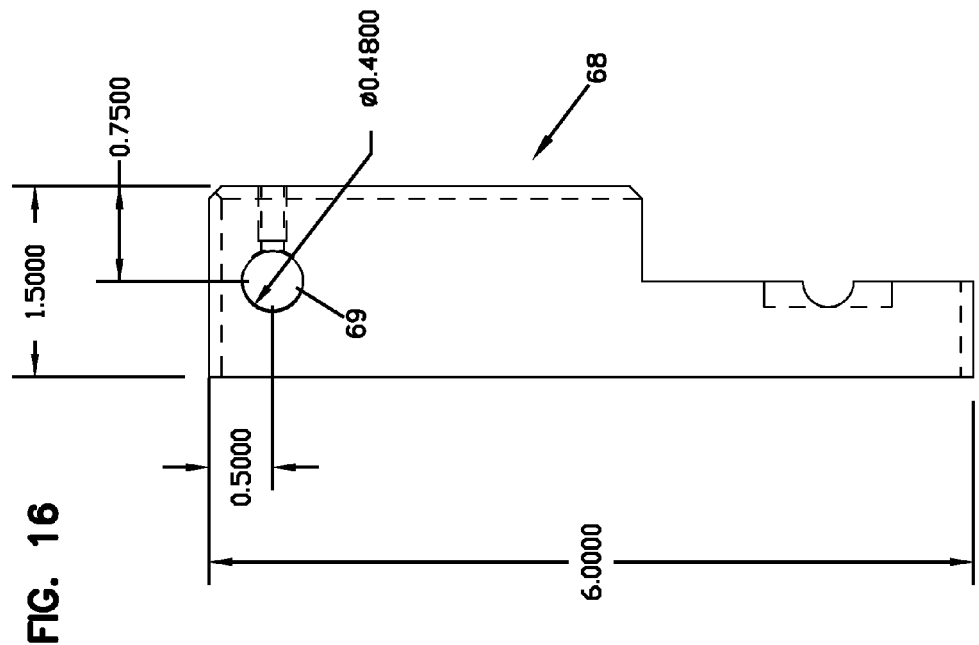
FIG. 16 is a left side view of the movable portion of the hybrid fiber/copper cable preparation tool of FIG. 14.

The movable portion 68 defines the second end 36 of the base 32. The stationary portion 66 defines a supplemental end surface 70 facing in the same direction as the second end 36. The preparation tool 30 includes a cutout 72 aligned with the cable channel 62 extending from the supplemental end surface 70 into the stationary portion 66 of the tool 30. A close up view of the cutout 72 is illustrated in FIG. 12A.

Figure 18:
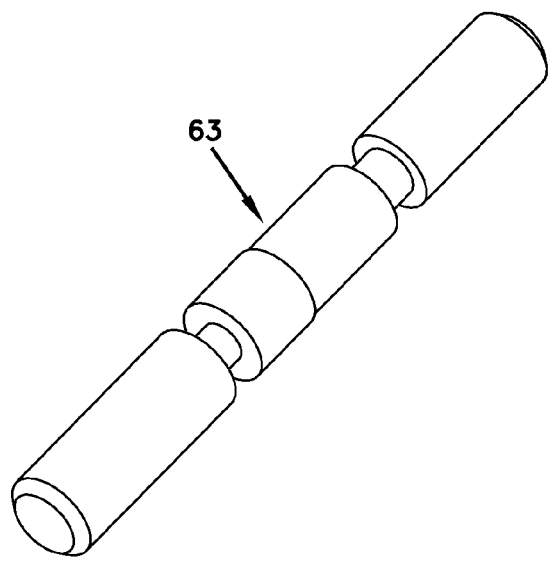
FIG. 18 is a perspective view of a pin used to pivotally couple the movable portion of the hybrid fiber/copper cable preparation tool to the stationary portion of the hybrid fiber/copper cable preparation tool.
Figure 19:
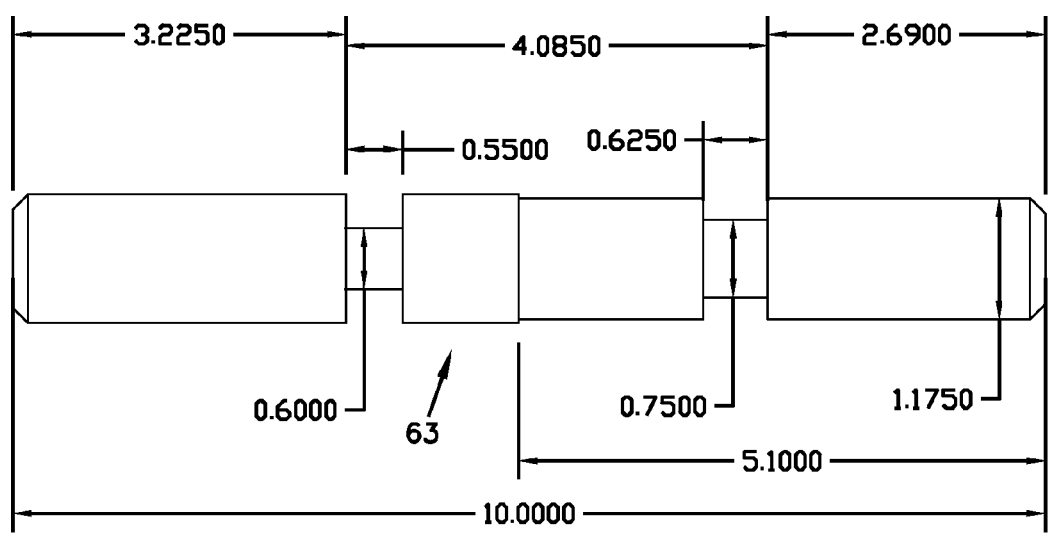
FIG. 19 is a top plan view of the pin of FIG. 18.

The movable portion 68 may be pivotally coupled to the stationary portion 66 by a variety of methods known in the art including a press-fit pin, a set screw, etc. An example structure in the form of a pin 63 used to couple the movable portion 68 to the stationary portion 66 is illustrated in FIGS. 18 and 19. The stationary portion 66 defines a first pin opening 67 and the movable portion 68 defines a second pin opening 69. Once opposing ends of the pin 63 have been inserted into the pin openings 67, 69, fasteners 65 may be used to fix the pin 63 to the stationary and movable portions 66, 68 of the preparation tool 30 (see FIGS. 1 and 2).

An exemplary method of using the preparation tool 30 is described below and illustrated in FIGS. 21-30. As will be described in further detail below, the preparation tool 30 may be provided as part of a cable preparation kit that may include one or more of the tool 30, a cutter 46, a marking tool 52, a metallic wire cutter 80 (e.g., a diagonal cutter), a fiber optic stripper tool 82 (i.e., a Micro strip tool), and a fiber optic cleaver.

Figure 21:
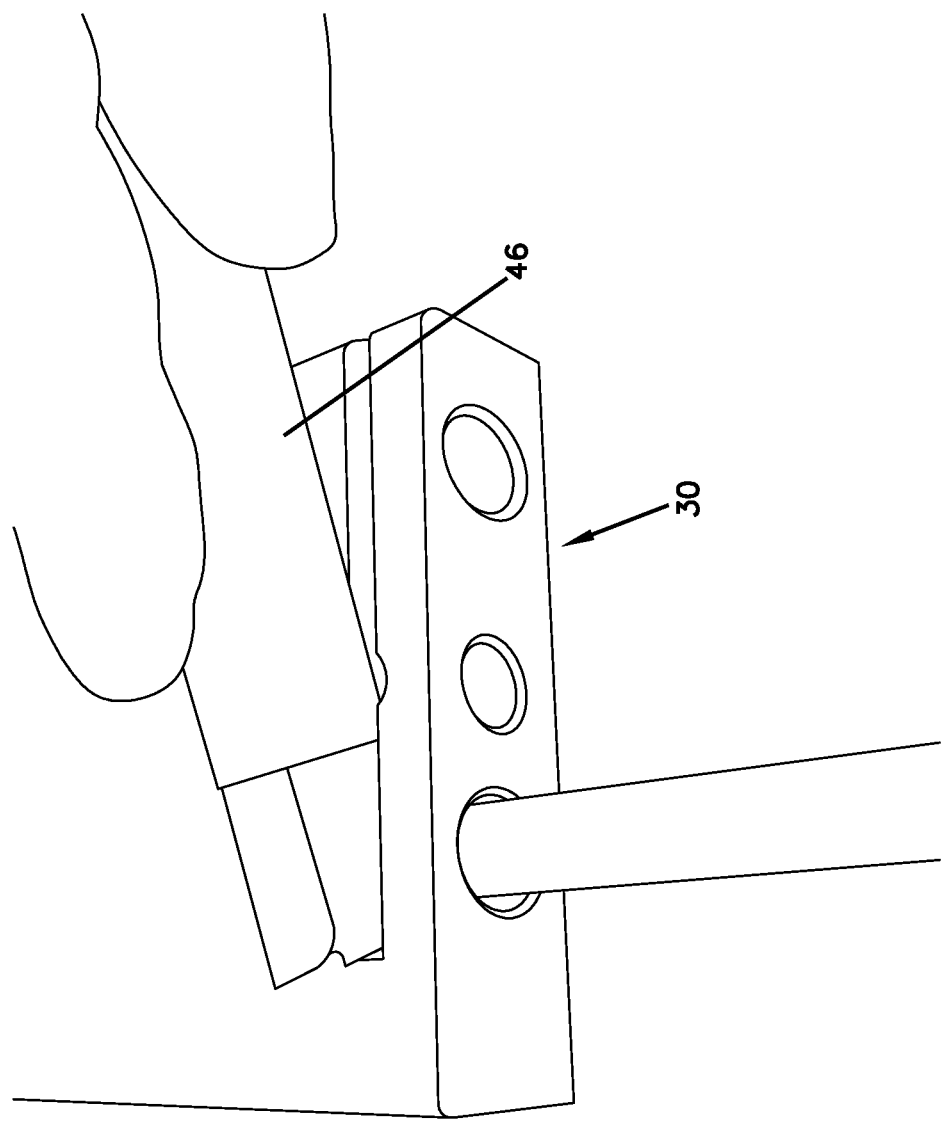
FIG. 21 illustrates an example method of stripping the outer jacket of a hybrid copper/fiber cable using the cable preparation tool shown in FIGS. 1-19.
Figure 22:
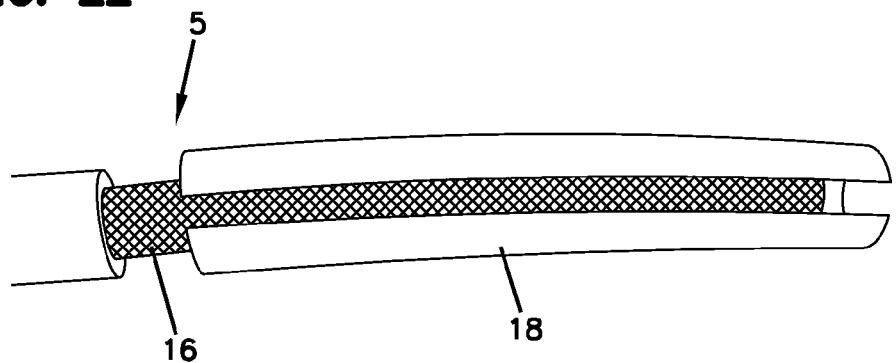
FIG. 22 illustrates a portion of the outer jacket of the hybrid copper/fiber cable to be removed in preparing the hybrid cable in accordance with the present disclosure.

According to an exemplary method, the following steps may be performed:

1) The hybrid cable 5 is inserted into the first cable insertion opening 42 until the end of the cable 5 abuts the end 43 of the opening 42. A cutter 46 is inserted into the first slot 44 in the first major side 38. As discussed above, the first slot 44 communicates with the first cable insertion opening 42 and the cutter 46 is used to cut the outer jacket 18 of the cable 5. In cutting the outer jacket 18, the cable 5 is rotated within the opening 42. This exemplary first step is illustrated in FIG. 21. The outer jacket 18 of the cable 5 may be cut along a longitudinal direction of the cable using the cutter 46. FIG. 22 illustrates the portion of the outer jacket 18 of the cable 5 that is to be removed in preparing the hybrid cable 5 in accordance with the present disclosure.

Figure 23:
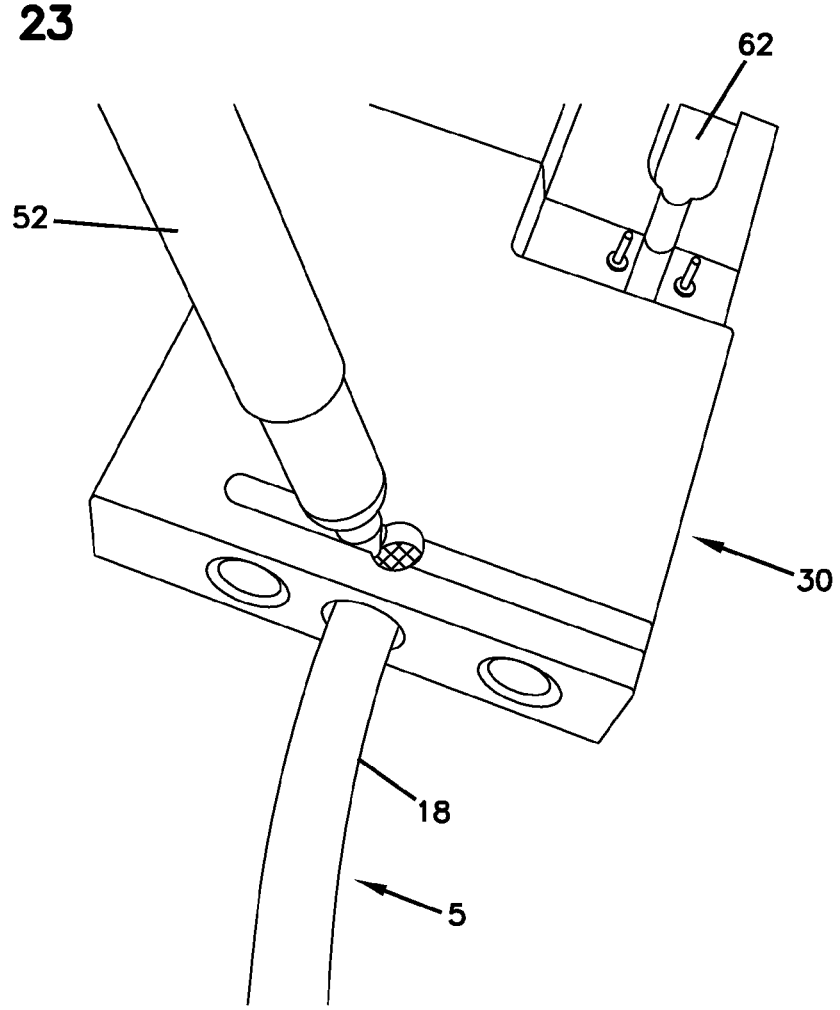
FIG. 23 illustrates an example method of marking the metal grounding braid of the hybrid copper/fiber cable using the cable preparation tool shown in FIGS. 1-19.
Figure 24:
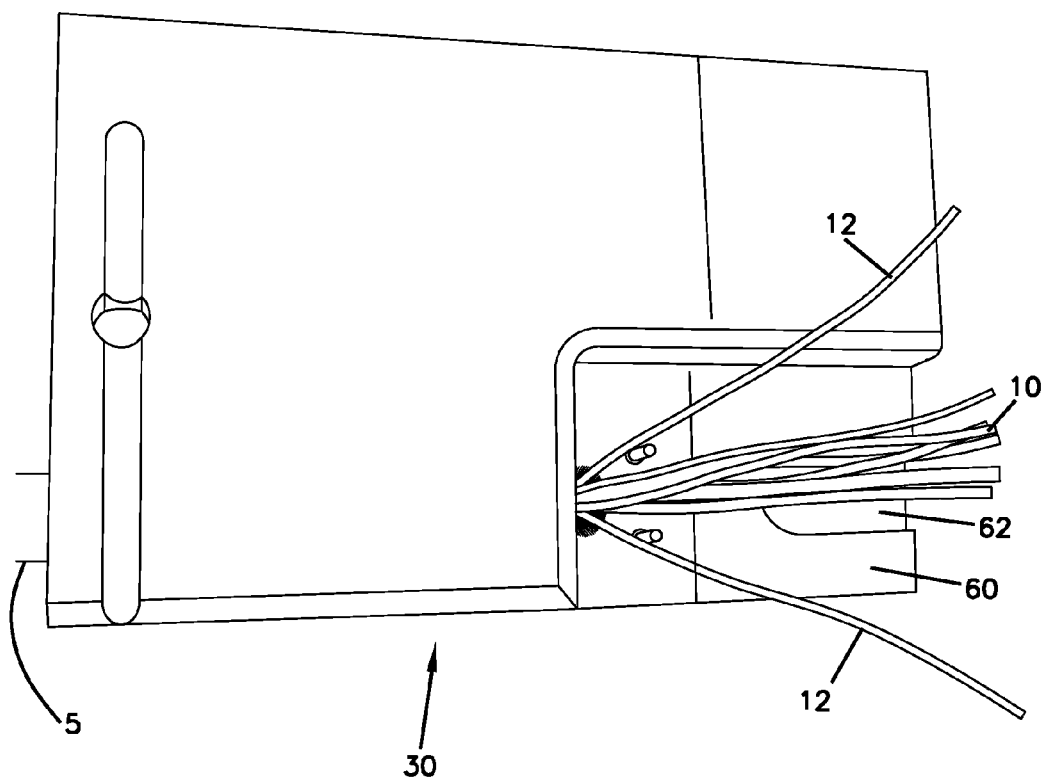
FIG. 24 illustrates the hybrid cable inserted into a third cable insertion opening of the cable preparation tool after the outer jacket has been removed and the metal grounding braid has been cut.
Figure 25:
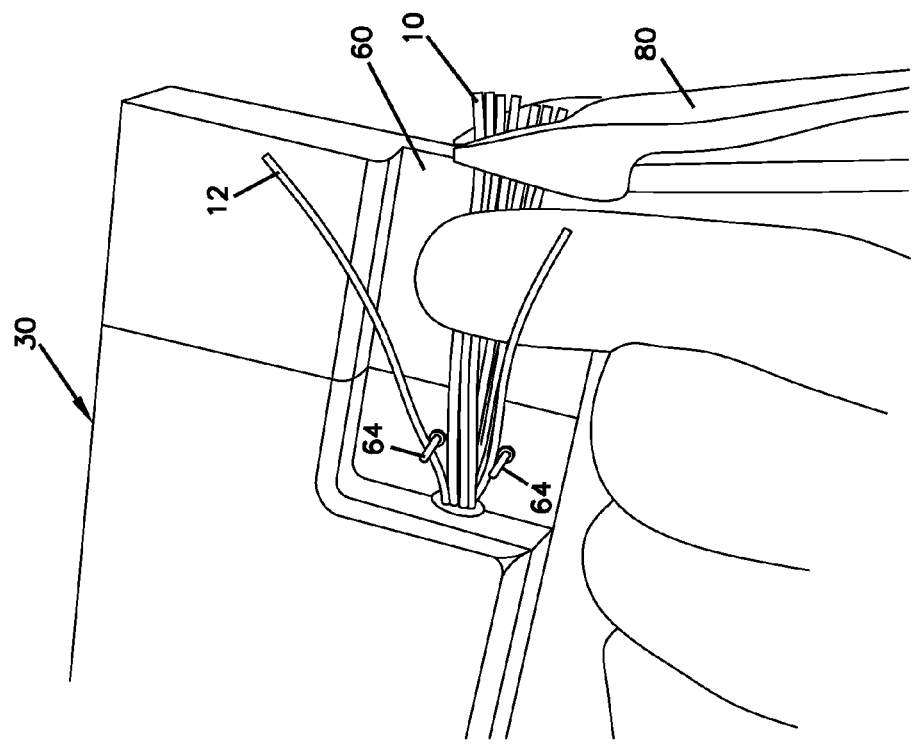
FIG. 25 illustrates an example method of cutting the copper wires and the strength member of the hybrid copper/fiber cable using the cable preparation tool shown in FIGS. 1-19.

2) Once the outer cable jacket 18 is removed, the cable 5 is inserted into the second opening 48 until the end of the cable 5 abuts the end 49 of the opening 48. As discussed previously, a second slot 50 in the first major side 38 is in communication with the second opening 48 and is used for receipt of a cable marking tool 52 (see FIG. 23). Once the metal grounding braid 16 is marked with the marking tool 52, the cable 5 is taken out of the opening 48 and the grounding braid 16 is cut, leaving 0.025 inches of the braid 16 exposed from the end of the outer jacket 18. FIG. 23 illustrates an example method of marking the metal grounding braid 16 of the hybrid copper/fiber cable 5 using the cable preparation tool 30.

3) Once the grounding braid 16 is cut to the desired length, the cable 5 is inserted into the third cable insertion opening 54. The cable 5 is inserted until the braid 16 abuts the stop surface 56. The copper wires (i.e., copper conductors) 10 and the strength member 14 are placed within the cable channel 62 while the optical fibers 12 are kept out of the channel 62 using the two projecting alignment pins 64 on the platform 60 on opposite sides of the cable channel 62 (see FIG. 24). Once the copper wires 10 and the strength member 14 are properly positioned, they are cut using the diagonal cutter 80 against the second end 36 of the tool 30 (see FIG. 25).

Figure 26:
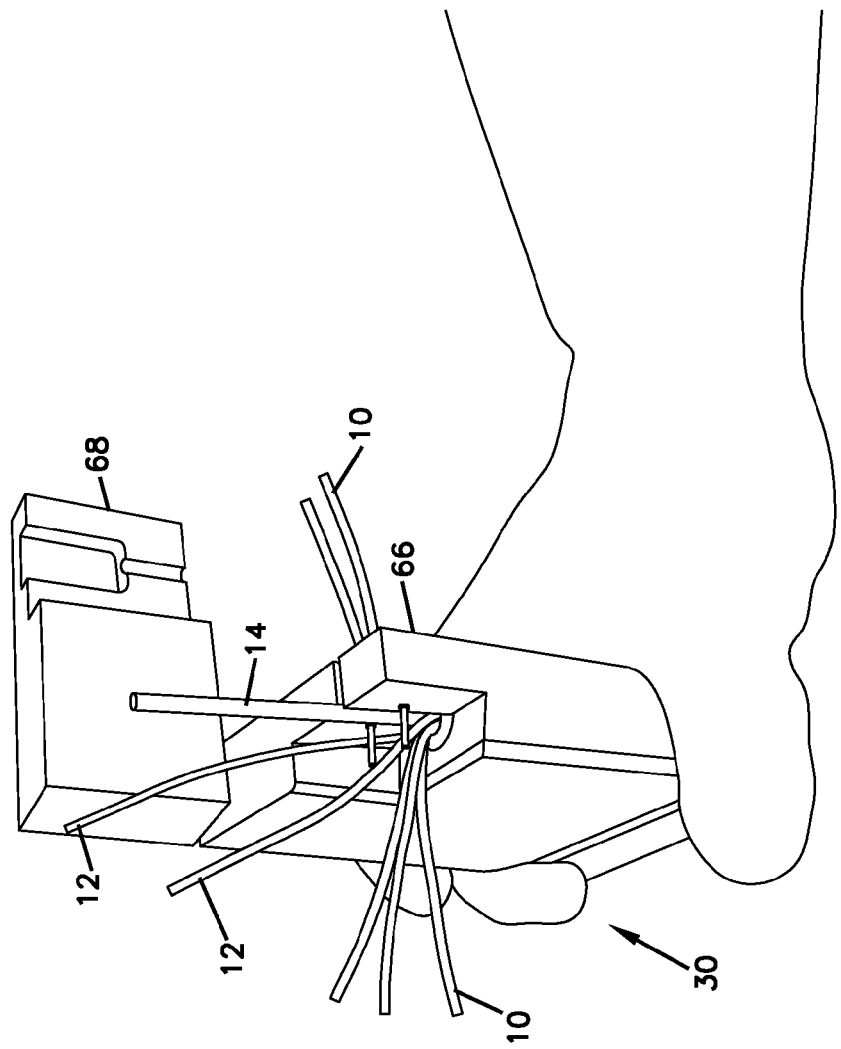
FIG. 26 illustrates the movable portion of the cable preparation tool pivotally moved with respect to the stationary portion of the cable preparation tool, with the copper wires, the optical fibers, and the strength member positioned for re-cutting the strength member.
Figure 27:
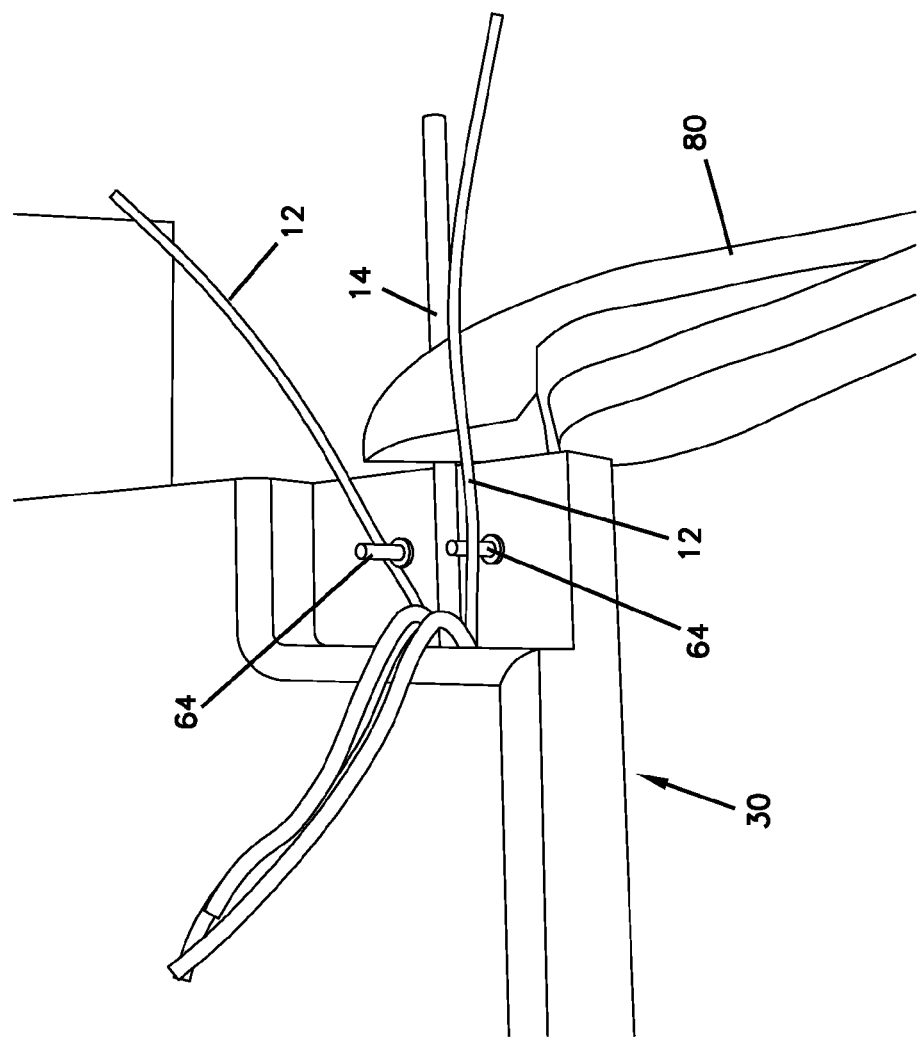
FIG. 27 illustrates an example method of cutting the strength member of the hybrid copper/fiber cable using the cable preparation tool shown in FIGS. 1-19.

4) As shown in FIG. 26, after the copper wires 10 and the strength member 14 are cut, the movable portion 68 of the cable preparation tool 30 is pivoted away from the stationary portion 66. The movable portion 68 can be pivoted upwardly or downwardly with respect to the stationary portion 66. According to the depicted example, the movable portion 68 is pivoted along a plane generally parallel to the supplemental end surface 70 of the stationary portion. At this point, the optical fibers 12 are kept out of the channel 62 using the alignment pins 64. The copper wires 10 are moved out of the channel 62. One example method of moving the copper wires 10 out of the channel 62 and out of the way of the strength member 14 is to bend half the copper wires upwardly while bending the other half downwardly through the cutout 72, leaving only the strength member 14 in the channel 62 (see FIG. 26). Once the copper wires 10 and the optical fibers 12 are out of the way, the strength member 14 is re-cut using the diagonal cutter 80 against the supplemental end surface 70 of the stationary portion 66 of the tool 30 (see FIG. 27).

Figure 28:
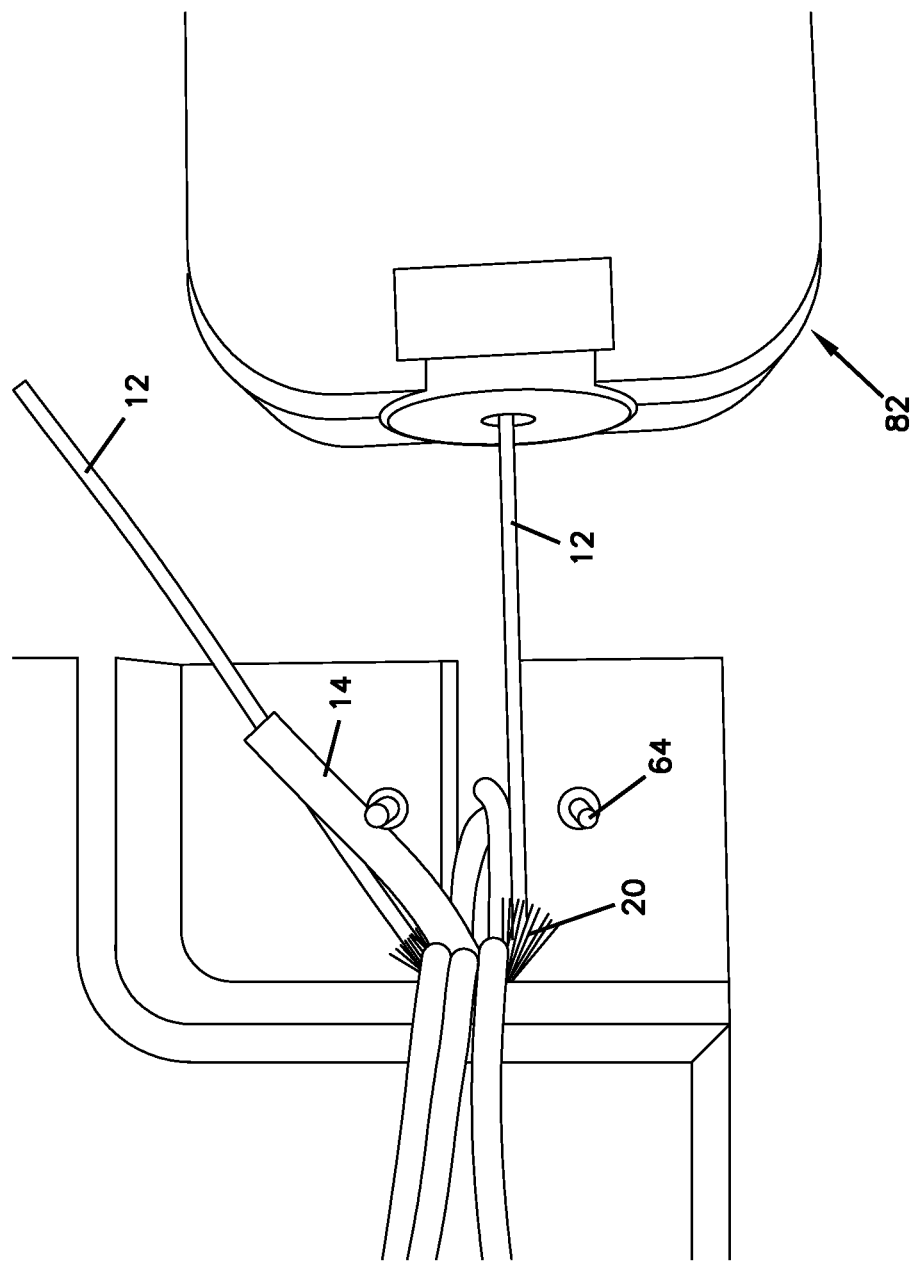
FIG. 28 illustrates the copper wires, the strength member, and the optical fibers of the hybrid cable positioned for stripping one of the optical fibers using the cable preparation tool shown in FIGS. 1-19.
Figure 29:
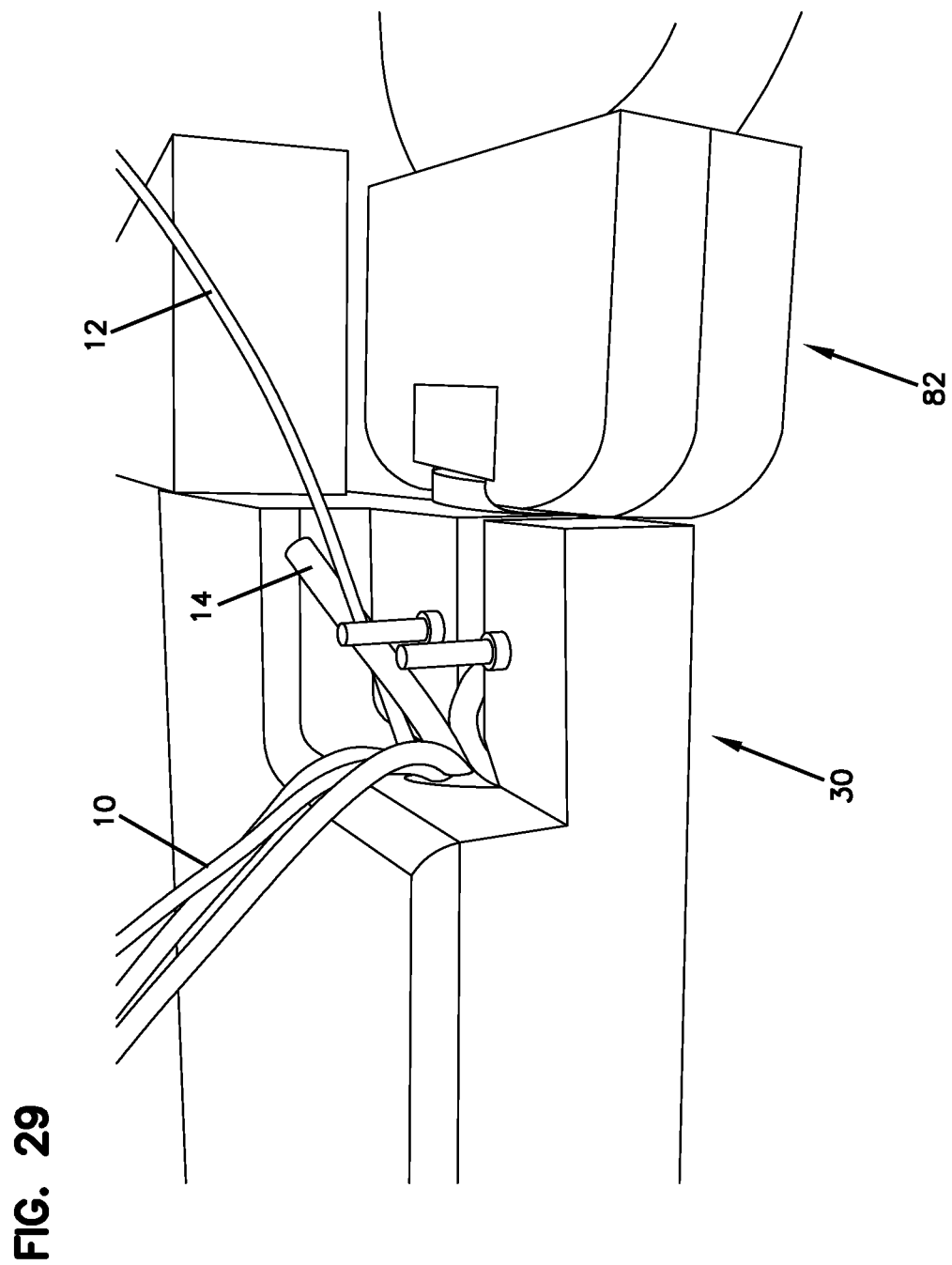
FIG. 29 illustrates an example method of stripping one of the optical fibers of the hybrid copper/fiber cable using the cable preparation tool shown in FIGS. 1-19.

5) After the strength member 14 has been cut to the appropriate length, the optical fibers 12 have to be stripped. In order to do so, as shown in FIG. 28, one of the fibers 12 and the strength member 14 is placed out of the channel 62, using one of the alignment pins 64. The other of the fibers 12 is moved into the channel 62 for buffer stripping. The copper wires 10 stay out of the channel 62 by being bent upwardly and downwardly (through the cutout 72). After the copper wires 10, the strength member 14, and one of the fibers 12 are out of the channel, the optical fiber 12 that is within the channel 62 is stripped to remove the buffer material from the fiber 12. As will be described in further detail, the buffer may be removed in multiple steps using a micro strip tool 82, shown in FIGS. 28-30. At the final strip, the stripping tool 82 should contact the supplemental end surface 70 of the stationary portion 66 of the tool 30. As shown in FIG. 30, a similar process is repeated to strip the other of the optical fibers 12. In doing so, the first stripped fiber is moved out of the channel 62 and kept out by the alignment pin 64 and the second fiber is placed into the channel 62.

As noted above, according to certainly exemplary methods, when the optical fibers 12 are being stripped using the micro strip tool 82, the optical fibers 12 are preferably stripped in multiple steps. For example, if a length of 30 mm of fiber buffer is exposed from the cable 5, the buffer should be stripped in about three steps, or 10 mm increments. If the buffer is stripped in longer segments, there is a risk that the optical fiber might break. Moreover, by stripping the fiber in segments, the buffer might be stretched or straightened (if provided in strands) in the first couple strips such that at the third and final strip, the buffer will be fully stretched or straightened within the cable 5. In accordance with the traditional methods, if the fiber is simply marked and stripped in one step, the buffer might become straightened afterward the stripping step and end up being longer in length than intended, throwing off the measurement within the connector.

Once the fiber 12 is stripped to the desired length, the final step is to cleave the fiber at the correct length. According to one example method, the fiber 12 might be cleaved at a length of about 4 mm from the end of the buffer tube. An optical fiber cleaving tool might be used to cleave the fiber 12 at the correct length. As discussed above, the preparation tool 30 allows the buffer to be pre-straightened during the stripping process so that when the fiber 12 is cleaved, the buffer is in a stretched-out configuration and does not end up being longer than desired at the end of the preparation process.

Figure 10:
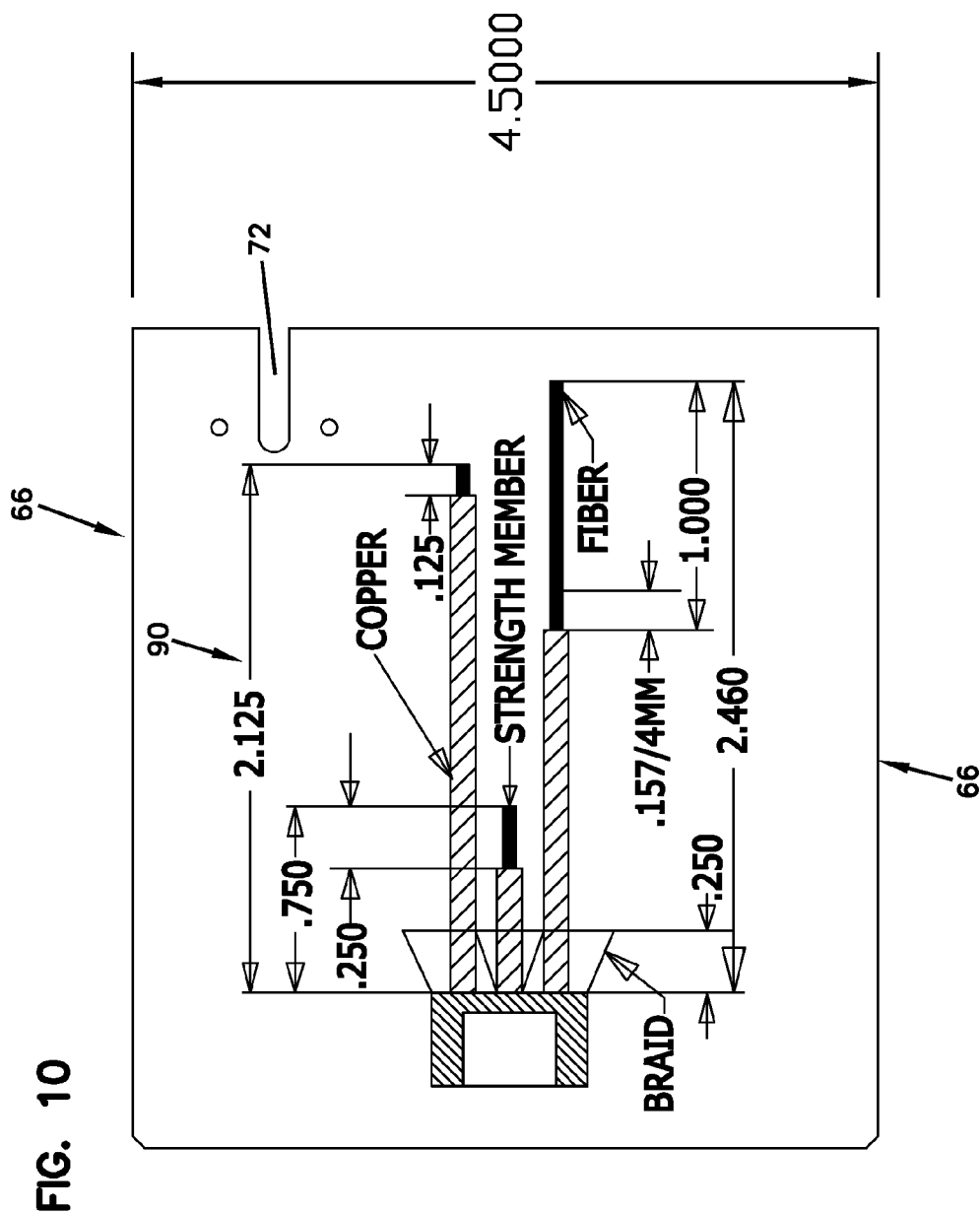
FIG. 10 is a bottom plan view of the stationary portion of the hybrid fiber/copper cable preparation tool of FIG. 6.
Figure 9:
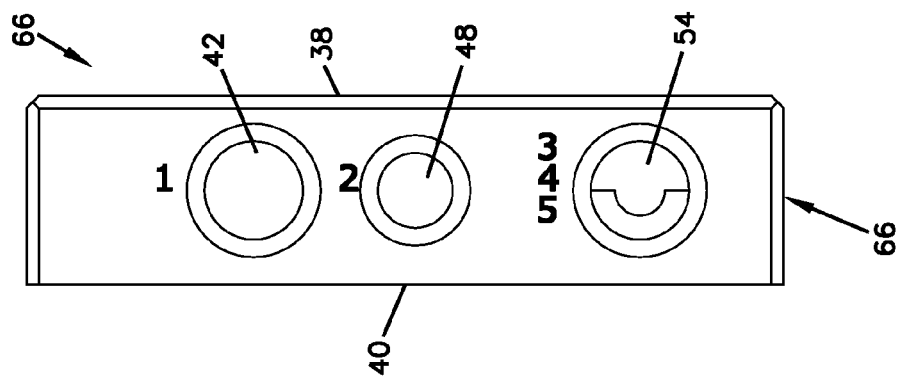
FIG. 9 is a left side view of the stationary portion of the hybrid fiber/copper cable preparation tool of FIG. 6.
Figure 11:
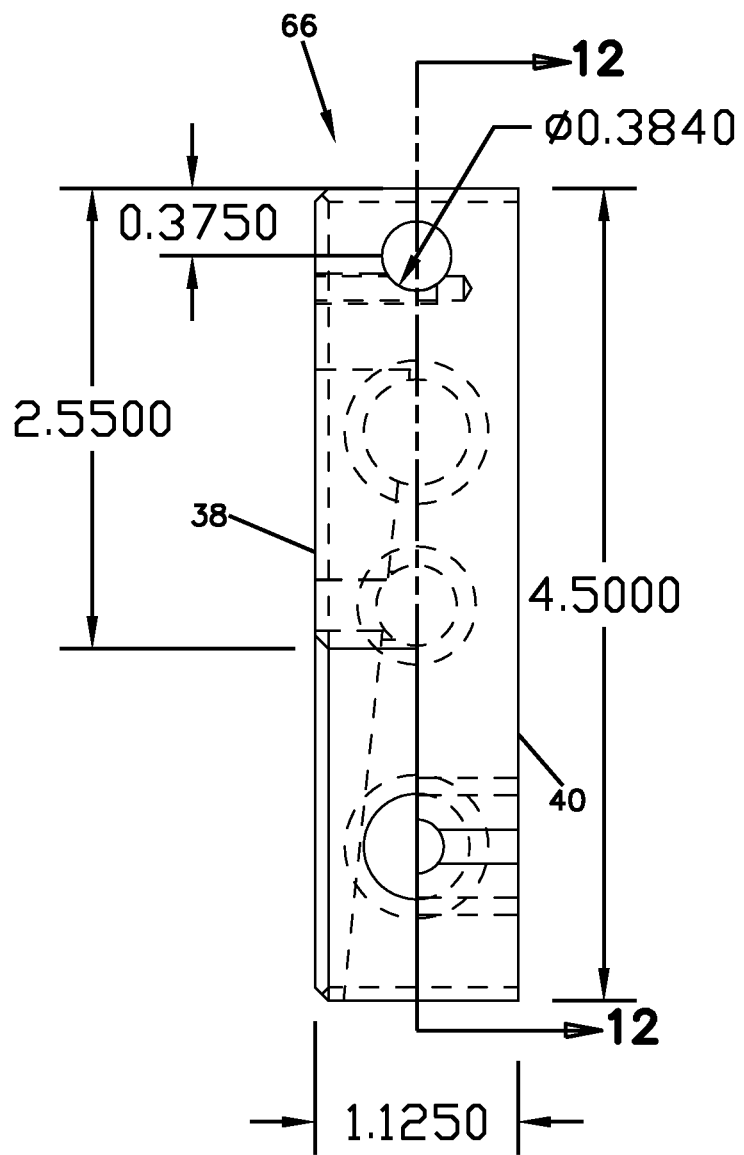
FIG. 11 is a right side view of the stationary portion of the hybrid fiber/copper cable preparation tool of FIG. 6.
Figure 20:
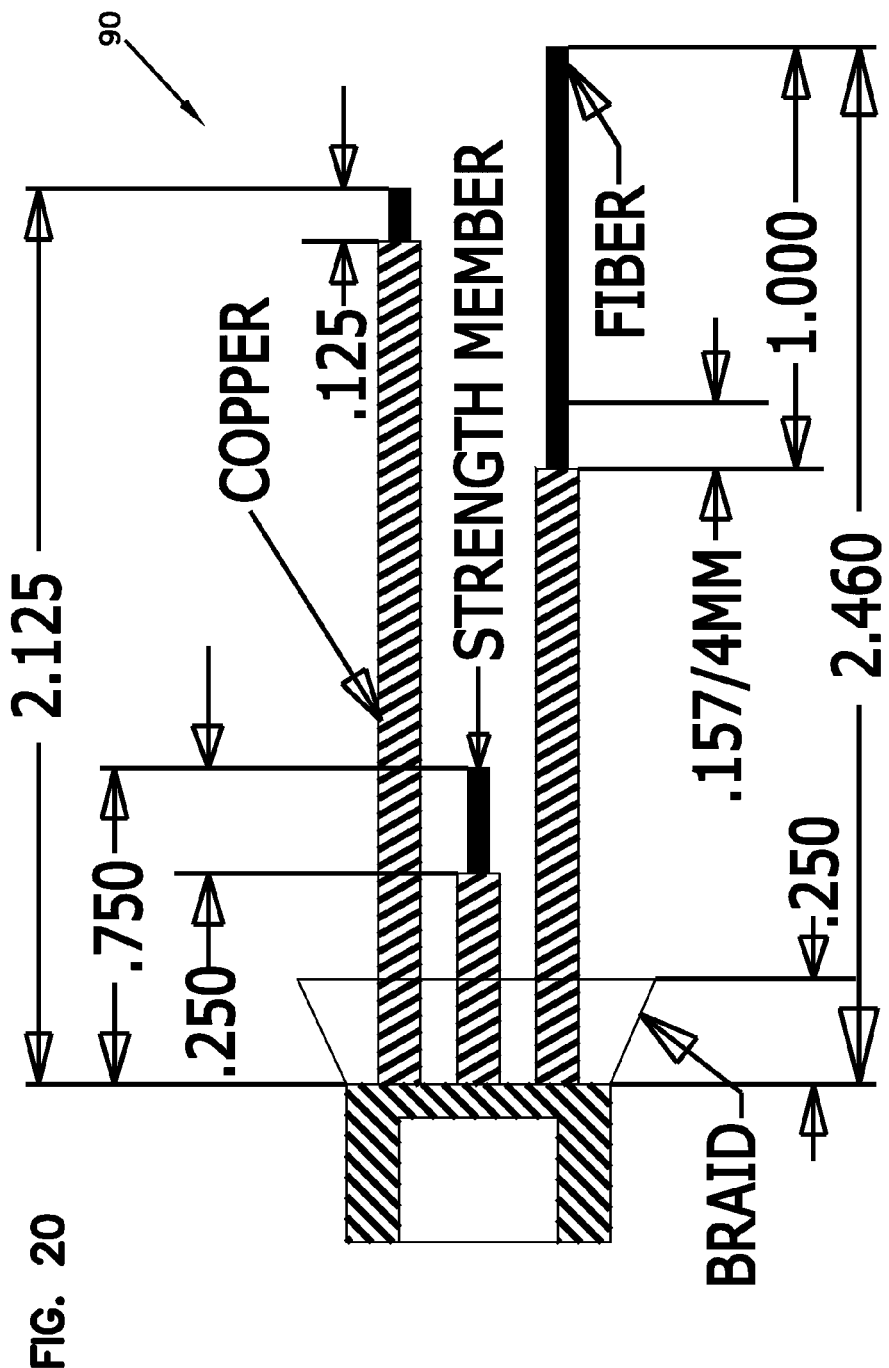
FIG. 20 illustrates a template used to verify the cut lengths of the copper wires, the optical fibers, the strength member, and the metal grounding braid of a hybrid cable prepared using the cable preparation tool shown in FIGS. 1-19, the template may be provided on the bottom side of the stationary portion of the cable preparation tool.

Once the outer cable jacket 18, the grounding braid 16, the copper wires 10, the strength member 14, and the optical fibers 12 are cut to the correct lengths, the cut lengths may be verified using a template 90, shown in FIG. 20. According to one example, the template 90 may be provided on the bottom side (i.e., second major side) 40 of the stationary portion 66 of the cable preparation tool 30, as shown in FIGS. 3 and 10 for convenience. Alternatively, the template 90 may be provided separately from the tool 30.

It should also be noted that the cable preparation tool 30 may be provided with cable preparation instruction indicia 53 as shown in FIGS. 1-3, 6-10, 14, and 15 to facilitate the cable preparation process for the user.

Although in the foregoing description, terms such as "top", "bottom", "front", "back", "right", and "left" were used for ease of description and illustration, no restriction is intended by such use of the terms. The cable preparation tool 30 described herein can be used in any orientation. All the dimensions illustrated in the Figures are in inches. It should be noted that the illustrated dimensions can vary depending upon the type of cable being prepared.

The above specification, examples and data provide a complete description of the manufacture and use of the inventive aspects of the present disclosure. Since many embodiments of the inventive aspects can be made without departing from the spirit and scope of the disclosure, the inventive aspects reside in the claims hereinafter appended.

The invention claimed is:

1. A preparation tool for preparing a hybrid fiber/copper cable for termination to a telecommunications connector, the preparation tool comprising:
    a base defining a first end, a second end, a first major side and a second major side, the base including a first portion and a second portion that is pivotally movable with respect to the first portion, the second portion defining the second end of the base, the first portion defining a supplemental end surface facing in the same direction as the second end;
    a first cable insertion opening extending from the first end toward the second end, wherein a first slot in the first major side is in communication with the first cable insertion opening for receipt of a jacket cutting tool;
    a second cable insertion opening extending from the first end toward the second end, wherein a second slot in the first major side is in communication with the second cable insertion opening for receipt of a cable marking tool;
    a third cable insertion opening extending from the first end toward the second end, wherein a stop surface is formed in the third cable insertion opening;
    a recess formed in the first major side and in the second end, the recess defining a platform;
    a cable channel extending from the third cable insertion opening across the platform to the second end of the base;
    two alignment pins projecting from the platform, the alignment pins located on opposite sides of the cable channel, the alignment pins located on the first portion of the base; and
    a cutout aligned with the cable channel, the cutout extending from the platform to the second major side and extending from the supplemental end surface into the first portion of the base.

2. A preparation tool according to claim 1, wherein the second portion is pivotally coupled to the first portion via a press-fit pin.

3. A preparation tool according to claim 1, wherein the second portion is pivotally movable with respect to the first portion along a plane parallel to the supplemental end surface.

4. A preparation tool according to claim 1, further comprising cable preparation instruction indicia provided on the tool.

5. A preparation tool according to claim 1, wherein the first, second, and third cable insertion openings are generally circular in cross-section.

6. A preparation tool according to claim 5, wherein the first cable insertion opening defines a larger diameter than the second cable insertion opening.

7. A preparation tool according to claim 1, further comprising a template provided on the tool, the template representing a correctly-prepared cable.

* * * * *